US009498934B2

(12) United States Patent
Paxson et al.

(10) Patent No.: US 9,498,934 B2
(45) Date of Patent: Nov. 22, 2016

(54) GRAFTED POLYMER SURFACES FOR DROPWISE CONDENSATION, AND ASSOCIATED METHODS OF USE AND MANUFACTURE

(71) Applicant: Massachusetts Institute of Technology, Cambridge, MA (US)

(72) Inventors: Adam T. Paxson, Cambridge, MA (US); Jose L. Yagüe, Somerville, MA (US); Kripa K. Varanasi, Lexington, MA (US); Karen K. Gleason, Cambridge, MA (US); Andong Liu, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 14/620,661

(22) Filed: Feb. 12, 2015

(65) Prior Publication Data

US 2016/0159038 A1    Jun. 9, 2016

Related U.S. Application Data

(63) Continuation of application No. 14/181,586, filed on Feb. 14, 2014.

(60) Provisional application No. 61/765,679, filed on Feb. 15, 2013, provisional application No. 61/874,941, filed on Sep. 6, 2013, provisional application No. 61/876,195, filed on Sep. 10, 2013.

(51) Int. Cl.
*B32B 15/082* (2006.01)
*F28F 13/04* (2006.01)
(Continued)

(52) U.S. Cl.
CPC .............. *B32B 15/082* (2013.01); *B05D 1/60* (2013.01); *B05D 5/08* (2013.01); *B32B 7/12* (2013.01);
(Continued)

(58) Field of Classification Search
CPC ............ C09K 5/00; B05D 1/60; B05D 3/02; B05D 5/08; B05D 5/083; F28F 13/182; F28F 19/04; F28F 2245/04; F28F 13/04; F28F 1/182; F28F 2245/043; Y10T 428/1352; Y10T 428/24355; Y10T 428/24851; Y10T 428/265; Y10T 428/3154; B32B 15/082
USPC .............. 428/141, 35.7, 336, 421; 525/326.2
See application file for complete search history.

(56) References Cited

U.S. PATENT DOCUMENTS 2,919,115 A    12/1959  Vaaler et al.
2,923,640 A    2/1960   Buckingham et al.
(Continued)

FOREIGN PATENT DOCUMENTS

CN    100344341 C    10/2007
CN    101269960 B    5/2011
(Continued)

OTHER PUBLICATIONS

Coclite et al. (Grafted crystalline poly-perfluoracrylate structures for superhydrophobic and oleophobic functional coatings, Adv. Mat. 2012 (24), p. 4534-4539).*
(Continued)

*Primary Examiner* — Yan Lan
(74) *Attorney, Agent, or Firm* — Dana M. Gordon; Foley Hoag LLP

(57) ABSTRACT

Presented herein are articles and methods featuring substrates with thin, uniform polymeric films grafted (e.g., covalently bonded) thereupon. The resulting coating provides significant reductions in thermal resistance, drop shedding size, and degradation rate during dropwise condensation of steam compared to existing coatings. Surfaces that promote dropwise shedding of low-surface tension condensates, such as liquid hydrocarbons, are also demonstrated herein.

23 Claims, 24 Drawing Sheets

(51) Int. Cl.

| | | |
|---|---|---|
| *F28F 21/06* | (2006.01) | |
| *B05D 5/08* | (2006.01) | |
| *B05D 1/00* | (2006.01) | |
| *F28F 13/18* | (2006.01) | |
| *C09K 5/00* | (2006.01) | |
| *B32B 7/12* | (2006.01) | |
| *B05D 3/02* | (2006.01) | |
| *F28F 19/04* | (2006.01) | |

(52) U.S. Cl.
CPC .............. *C09K 5/00* (2013.01); *F28F 13/04* (2013.01); *F28F 13/182* (2013.01); *F28F 21/06* (2013.01); *B05D 3/02* (2013.01); *B05D 5/083* (2013.01); *B32B 2307/302* (2013.01); *F28F 19/04* (2013.01); *F28F 2245/04* (2013.01); *Y10T 428/1352* (2015.01); *Y10T 428/24355* (2015.01); *Y10T 428/24851* (2015.01); *Y10T 428/265* (2015.01); *Y10T 428/3154* (2015.04)

(56) References Cited

U.S. PATENT DOCUMENTS

| | | | |
|---|---|---|---|
| 3,167,927 | A | 2/1965 | Lynch et al. |
| 3,289,753 | A | 12/1966 | Erb |
| 3,289,754 | A | 12/1966 | Erb |
| 3,305,007 | A | 2/1967 | Thelen et al. |
| 3,466,189 | A | 9/1969 | Erb |
| 3,878,885 | A | 4/1975 | Deronzier et al. |
| 3,899,366 | A | 8/1975 | Tajkowski |
| 4,069,933 | A | 1/1978 | Newing |
| 4,204,021 | A | 5/1980 | Becker |
| 4,316,745 | A | 2/1982 | Blount |
| 4,968,392 | A | 11/1990 | Smith et al. |
| 5,380,557 | A | 1/1995 | Spiro |
| 5,624,713 | A | 4/1997 | Ramer |
| 5,853,802 | A | 12/1998 | Boyer et al. |
| 5,888,591 | A | 3/1999 | Gleason et al. |
| 6,045,877 | A | 4/2000 | Gleason et al. |
| 6,156,435 | A | 12/2000 | Gleason et al. |
| 6,428,863 | B1 | 8/2002 | Leipertz et al. |
| 6,887,578 | B2 | 5/2005 | Gleason et al. |
| 7,563,734 | B2 | 7/2009 | Gleason et al. |
| 7,622,197 | B2 | 11/2009 | Balow et al. |
| 7,722,951 | B2 | 5/2010 | Li et al. |
| 7,887,934 | B2 | 2/2011 | Gentleman et al. |
| 7,892,660 | B2 | 2/2011 | Gentleman et al. |
| 7,897,271 | B2 | 3/2011 | Gentleman et al. |
| 7,901,798 | B2 | 3/2011 | Gentleman et al. |
| 7,977,267 | B2 | 7/2011 | Gentleman et al. |
| 8,057,922 | B2 | 11/2011 | Gentleman et al. |
| 8,057,923 | B2 | 11/2011 | Gentleman et al. |
| 8,062,775 | B2 | 11/2011 | Gentleman et al. |
| 8,173,279 | B2 | 5/2012 | Gentleman et al. |
| 8,178,219 | B2 | 5/2012 | Gentleman et al. |
| 8,222,172 | B2 | 7/2012 | Gentleman et al. |
| 8,227,025 | B2 | 7/2012 | Pryce Lewis et al. |
| 8,236,432 | B2 | 8/2012 | Gentleman et al. |
| 8,574,704 | B2 | 11/2013 | Smith et al. |
| 2002/0164443 | A1 | 11/2002 | Oles et al. |
| 2003/0096083 | A1 | 5/2003 | Morgan et al. |
| 2003/0134035 | A1 | 7/2003 | Lamb et al. |
| 2003/0203117 | A1 | 10/2003 | Bartkowiak et al. |
| 2004/0026832 | A1 | 2/2004 | Gier et al. |
| 2004/0219373 | A1 | 11/2004 | Deruelle et al. |
| 2005/0003146 | A1 | 1/2005 | Spath |
| 2005/0016489 | A1 | 1/2005 | Endicott et al. |
| 2005/0112326 | A1 | 5/2005 | Nun et al. |
| 2005/0136217 | A1 | 6/2005 | Barthlott et al. |
| 2005/0208272 | A1 | 9/2005 | Groll |
| 2006/0013735 | A1 | 1/2006 | Engelking et al. |
| 2006/0078724 | A1 | 4/2006 | Bhushan et al. |
| 2006/0147675 | A1 | 7/2006 | Nun et al. |
| 2006/0204738 | A1 | 9/2006 | Dubrow et al. |
| 2006/0246226 | A1 | 11/2006 | Dai et al. |
| 2007/0031639 | A1 | 2/2007 | Hsu et al. |
| 2007/0032620 | A1 | 2/2007 | Gleason et al. |
| 2007/0207335 | A1 | 9/2007 | Karandikar et al. |
| 2007/0235890 | A1 | 10/2007 | Pryce Lewis et al. |
| 2007/0282247 | A1 | 12/2007 | Desai et al. |
| 2007/0298216 | A1 | 12/2007 | Jing et al. |
| 2008/0085070 | A1 | 4/2008 | Hirata et al. |
| 2008/0118763 | A1 | 5/2008 | Balow et al. |
| 2009/0155609 | A1 | 6/2009 | Gentleman et al. |
| 2009/0231273 | A1 | 9/2009 | Lashina et al. |
| 2010/0092621 | A1 | 4/2010 | Akutsu et al. |
| 2010/0285229 | A1 | 11/2010 | Elbahri et al. |
| 2011/0052902 | A1 | 3/2011 | Gentleman et al. |
| 2011/0077172 | A1 | 3/2011 | Aizenberg et al. |
| 2011/0201984 | A1 | 8/2011 | Dubrow et al. |
| 2011/0283778 | A1 | 11/2011 | Angelescu et al. |
| 2011/0305898 | A1* | 12/2011 | Zhang .................... A61L 27/34 428/336 |
| 2012/0003497 | A1 | 1/2012 | Handy et al. |
| 2012/0036846 | A1 | 2/2012 | Aizenberg et al. |
| 2013/0032316 | A1 | 2/2013 | Dhiman et al. |
| 2013/0032646 | A1 | 2/2013 | Dhiman et al. |
| 2013/0034695 | A1 | 2/2013 | Smith et al. |
| 2013/0040102 | A1 | 2/2013 | Gleason et al. |
| 2013/0062285 | A1 | 3/2013 | Hoek et al. |
| 2013/0146536 | A1 | 6/2013 | Tarabara et al. |
| 2013/0171546 | A1 | 7/2013 | White et al. |
| 2013/0178568 | A1 | 7/2013 | Meuler et al. |
| 2013/0220813 | A1 | 8/2013 | Anand et al. |
| 2013/0251769 | A1 | 9/2013 | Smith et al. |
| 2013/0251942 | A1 | 9/2013 | Azimi et al. |
| 2013/0251946 | A1 | 9/2013 | Azimi et al. |
| 2013/0251952 | A1 | 9/2013 | Smith et al. |
| 2013/0280442 | A1 | 10/2013 | Gleason et al. |
| 2013/0280485 | A1 | 10/2013 | Coclite et al. |
| 2013/0333789 | A1 | 12/2013 | Smith et al. |
| 2013/0335697 | A1 | 12/2013 | Smith et al. |
| 2013/0337027 | A1 | 12/2013 | Smith et al. |
| 2014/0000857 | A1 | 1/2014 | King |
| 2014/0291420 | A1 | 10/2014 | Dhiman et al. |
| 2014/0314982 | A1 | 10/2014 | Paxson et al. |

FOREIGN PATENT DOCUMENTS

| | | |
|---|---|---|
| DE | 198 18 956 A1 | 11/1998 |
| EP | 2028432 A1 | 2/2009 |
| EP | 2143818 A1 | 1/2010 |
| JP | 1 170932 A | 7/1989 |
| JP | 5 240251 A | 9/1993 |
| JP | 2004 037764 A | 2/2004 |
| JP | 2008240910 A | 10/2008 |
| TW | I 233 968 B | 6/2005 |
| WO | WO-93/17077 A1 | 9/1993 |
| WO | WO-99/36490 A1 | 7/1999 |
| WO | WO-02/062568 A2 | 8/2002 |
| WO | WO-03/071275 A1 | 8/2003 |
| WO | WO-2004001832 A1 | 12/2003 |
| WO | WO-2006/017009 A2 | 2/2006 |
| WO | WO-2006/091235 A1 | 8/2006 |
| WO | WO-2007/019362 A1 | 2/2007 |
| WO | WO-2008/111603 A1 | 9/2008 |
| WO | WO-2010/082710 A1 | 7/2010 |
| WO | WO-2010/129807 A1 | 11/2010 |
| WO | WO-2011/087458 A1 | 7/2011 |
| WO | WO-2011/143371 A1 | 11/2011 |
| WO | WO-2012/024099 A1 | 2/2012 |
| WO | WO-2012/100099 A2 | 7/2012 |
| WO | WO-2012/100100 A2 | 7/2012 |
| WO | WO-2013/022467 A2 | 2/2013 |
| WO | WO-2013/025480 A1 | 2/2013 |
| WO | WO-2013/130118 A1 | 9/2013 |
| WO | WO-2013/141888 A1 | 9/2013 |
| WO | WO-2013/141953 A2 | 9/2013 |

(56) References Cited

FOREIGN PATENT DOCUMENTS

WO   WO-2013/158224 A1   10/2013
WO   WO-2013184559 A1    12/2013

OTHER PUBLICATIONS

Coclite et al. (entitled "Controlling the Degree of Crystallinity and Preferred Crystallographic Orientation in Poly-perfluorodecylacrylate Thin Films by Initiated Chemical Vapor Deposition", Advance Functional Materials, 2012, 22, 2167-2176).*
Alf et al., Chemical Vapor Deposition of Conformal, Functional, and Responsive Polymer Films, Adv. Mater. 22:1993-2027, (2010).
Allain et al., A New Method for Contact-Angle Measurements of Sessile Drops, Journal of Calloid and Interface Science, vol. 107, No. 1, Sep. 1985, 9 pages.
Anand et al., Enhanced Condensation on Lubricant-Impregnated Nanotextured Surfaces, ACS Nano, 6(11):10122-10129 (2012).
Antonini et al., Water Drops Dancing on Ice: How Sublimation Leads to Drop Rebound, PRL 111, 014501 (2013).
Arkles, Hydrophobicity, Hydrophilicity and Silanes, Paint and Coatings Industry, Oct. 1, 2006, 10 pages.
Ashkin et al., Optical levitation by radiation pressure, Applied Physics Letters, 19(8):283-285 (1971).
Ashkin et al., Optical levitation of liquid drops by radiation pressure, Science, 187(4181):1073-1075 (1975).
Avedisian et al., Leidenfrost boiling of methanol droplets on hot porous/ceramic surfaces, International Journal of Heat and Mass Transfer, 30(2):379-393 (1987).
Azimi, G. et al., Hydrophobicity of rare-earth oxide ceramics, Nature Materials, DOI:10.1038/NMAT3545, (2013).
Baier et al., Propulsion Mechanisms for Leidenfrost Solids on Ratchet Surfaces, arXiv preprint arXiv:1208.5721 (2012).
Baier et al., Propulsion mechanisms for Leidenfrost solids on ratchets, Physical Review E—Statistical, Nonlinear, and Soft Matter Physics, 87(2) (2013).
Barnes, Geoff T., The Potential for Monolayers to Reduce the Evaporation of Water From Large Water Storages, Agricultural Water Management 95, 4:339-353, (2008).
Bauer et al., The insect-trapping rim of Nepenthes pitchers: surface structure and function, Plant Signaling & Behavior, 4 (11): 1019-1023 (2009).
Beaugnon et al., Dynamics of magnetically levitated droplets, Physica B: Condensed Matter, 294-295:715-720 (2001).
Biance et al., Leidenfrost drops, Physics of Fluids, 15(6):1632-1637 (2003).
Bico et al., Pearl drops, Europhysics Letters, 47(2):220-226 (1999).
Blossey, R., Self-cleaning surfaces—Virtual realities, Nature Materials, 2(5):301-306 (2003).
Bohn et al., Insect aquaplaning: Nepenthes pitcher plan s capture prey with the peristome, a fully wettable water-lubricated anisotropic surface, Proceedings of the National Academy of Sciences, 14138-14143 (2004).
Burton, et al., Geometry of the Vapor Layer Under a Leidenfrost Drop, Physical Review Letters, 109(7):074301 (2012).
Cao et al., Anti-Icing Superhydrophobic Coatings, Langmuir Letter, 2009, A-E.
Cassie et al., Wettability of porous surfaces, Transactions of the Faraday Society, 40: 546-551, (1944).
Celestini, et al., Take Off of Small Leidenfrost Droplets, Physical Review Letters, 109(3):034501 (2012).
Chandra et al., Leidenfrost evaporation of liquid nitrogen droplets, Transactions—ASME: Journal of Heat Transfer, 116(4):999-1006 (1994).
Chandra et al., Observations of droplet impingement on a ceramic porous surface, International Journal of Heat and Mass Transfer 35(10):2377-2388 (1992).
Chen et al., A Wettability Switchable Surface by Microscale Surface Morphology Change, Journal of Micromechanics & Microengineering, Institute of Physics Publishing, 17(3): 489-195 (2007).

Cummings et al., Oscillations of magnetically levitated aspherical droplets, Journal of Fluid Mechanics, 224:395-416 (1991).
Deng et al., Nonwetting of impinging droplets on textured surfaces, Applied Physics Letters, 94(13) 133109 1-3 (2009).
Eck, S. et al., Growth and thermal properties of ultrathin cerium oxide layers on Rh(111), Surface Science, 520:173-185, (2002).
Elbahri et al., Anti-lotus Effect for Nanostructuring at the Leidenfrost Temperature, Advanced Materials, 19(9):1262-1266 (2007).
Feng et al., Design and creation of superwetting/antiwetting surfaces, Advanced Materials, 18(23):3063-3078 (2006).
Fondecave, R. and Wyart, F.B., Polymers as Dewetting Agents, Marcomolecules 31:9305-9315 (1998).
Fujimoto et al., Deformation and rebounding processes of a water droplet impinging on a flat surface above Leidenfrost temperature, Journal of Fluids Engineering, Transactions of the ASME, 118(1):142-149 (1996).
Furmidge, Studies at Phase Interfaces, Journal of Colloid Science, 1962, 17: 309-324.
Gao et al., Artificial lotus leaf prepared using a 1945 patent and a commercial textile, Langmuir, 22(14):5998-6000 (2006).
Goldshtik et al., A liquid drop on an air cushion as an analogue of Leidenfrost boiling, Journal of Fluid Mechanics, 166:1-20 (1986).
Gradeck et al., Heat transfer for Leidenfrost drops bouncing onto a hot surface, Experimental Thermal and Fluid Science, 47:14-25 (2013).
Hashmi et al., Leidenfrost levitation: Beyond droplets, Scientific Reports, 2:797:1-4 (2012).
Hejazi et al., Wetting Transitions in Two-, Three-, and Four-Phase Systems, Langmuir, 28:2173-2180 (2012).
Holden et al., The Use of Organic Coatings to Promote Dropwise Condensation of Steam, Journal of Heat Transfer, 109: 768-774 (1987).
International Preliminary Report on Patentability, PCT/US2011/061498, Feb. 13, 2014, 12 pages.
International Search Report and Written Opinion for PCT/US2011/061498, dated Jul. 31, 2012, 17 pages.
International Search Report, PCT/US14/16621, mailing date Jun. 13, 2014, 4 pages.
International Search Report, PCT/US2011/061898, Apr. 24, 2013, 6 pages.
International Search Report, PCT/US2012/030370, Oct. 15, 2012, 6 pages.
International Search Report, PCT/US2012/042326, Dec. 3, 2012, 4 pages.
International Search Report, PCT/US2012/042327, May 16, 2013, 6 pages.
International Search Report, PCT/US2013/021558, Oct. 11, 2013, 5 pages.
International Search Report, PCT/US2013/028439, Dec. 5, 2013, 6 pages.
International Search Report, PCT/US2013/042771, May 26, 2014, 4 pages.
International Search Report, PCT/US2013/045731, Nov. 12, 2013, 3 pages.
International Search Report, PCT/US2013/070827, Mar. 27, 2014, 7 pages.
Iwasa, et al., 'Electromaglev'—Magnetic levitation of a superconducting disc with a DC field generated by electromagnets: Part 1. Theoretical and experimental results on operating modes, lift-to-weight ratio, and suspension stiffness, Cryogenics, 37(12):807-816, (1997).
Jung et al., Are Superhydrophobic Surfaces Best for Icephobicity? Langmuir, 27(6):3059-3066 (2011).
Kim et al., Hierarchical or not? Effect of the length scale and hierarchy of the surface roughness on omniphobicity of lubricant-infused substrates, Nano Letters, 13(4):1793-1799 (2013).
Kim et al., Levitation Time Measurement of Water Drops on the Surface of Liquid Nitrogen, Journal of the Korean Physical Society, vol. 58, No. 6, pp. 1628-1632 (Jun. 2011).
Kim, Heetae, Floating Phenomenon of a Water Drop on the Surface of Liquid Nitrogen, Journal of the Korean Physical Society, vol. 49, No. 4, pp. L1335-L1338 (Oct. 2006).

(56) References Cited

OTHER PUBLICATIONS

Kulinich et al., Ice Adhesion on Super-Hydrophobic Surfaces, Applied Surface Science, 2009, 225: 8153-8157.
Lafuma, A. et al., Slippery Pre-Suffused Surfaces, EPL, 96: 56001-p1-56001-p4 (2011).
Lagubeau et al., Leidenfrost on a ratchet, Nature Physics, 7(5):395-398 (2011).
Lau et al., Hot-Wire Hemical Vapor Deposition (HWCVD) of Fluorocarbon and Organosilicon Thin Films, Think Solid Films 395:288-291, (2001).
Lee et al., Dynamic Wetting and Spreading Characteristics of a Liquid Droplet Impinging on Hydrophobic Textured Surfaces, Langmuir, (2011), 27, 6565-6573.
Leidenfrost, J. G., On the fixation of water in diverse fire, International Journal of Heat and Mass Transfer, 9(11):1153-1166 (1966).
Li et al., Dynamic Behavior of the Water Droplet Impact on a Textured Hydrophobic/Superhydrophobic Surface: The Effect of the Remaining Liquid Film Arising on the Pillars' Tops on the Contact Time, Langmuir, (2010), 26(7), 4831-4838.
Linke et al., Self-propelled leidenfrost droplets, Physical Review Letters, 96(15) (2006).
Liu et al., Metallic Surfaces with Special Wettability, Nanoscale, 3:825-238 (2011).
Marin et al., Capillary droplets on Leidenfrost micro-ratchets, arXiv preprint arXiv:1210.4978 (2012).
Matolín, V. et al., Growth of ultra-thin cerium oxide layers on Cu(111), Surface Science 254:153-155, (2007).
Meuler et al., Exploiting Topographical Texture To Impact Icephobicity, ACS Nano, 2010, 4(12): 7048-7052.
Mills, A. A., Pillow lavas and the Leidenfrost effect, Journal of the Geological Society, 141(1):183-186 (1984).
Mishchenko et al., Design of ice-free nanostructured surfaces based on repulsion of impacting water droplets, ACS Nano, 4(12):7699-7707 (2010).
Mullins, D. R. et al., Ordered cerium oxide thin films gown on Ru(0001) and Ni(111), Surface Science, 429:186-198, (1999).
Onda et al., Super-water-repellent fractal surfaces, Langmuir, 12(9) (1996).
Ou et al., Laminar drag reduction in microchannels using ultrahydrophobic surfaces, Physics of Fluids, 16(12):4635-4643 (2004).
Park et al., A Numerical Study of the Effects of Superhydrophobic Surface on Skin-Friction Drag in Turbulent Channel Flow, Phys. Fluids 25, 110815 (2013).
Paxson et al., Stable Dropwise Condensation for Enhancing Heat Transfer via the Initiated Chemical Vapor Deposition (iCVD) of Grafted Plymer Films, Adv. Mater. 2013.
Piroird et al., Magnetic control of Leidenfrost drops, Physical Review E—Statistical, Nonlinear, and Soft Matter Physics, 85(5) (2012).
Pozzato et al., Superhydrophobic surfaces fabricated by nanoimprint lithography, Microelectronic Engineering, 83, (2006), 884-888.
Prat et al., On the effect of surface roughness on the vapor flow under Leidenfrost-Levitated droplets, Journal of Fluids Engineering, Transactions of the ASME, 117(3):519-525 (1995).
Quéré et al., Surfing the hot spot, Nature Materials, 5(6):429-430 (2006).
Quéré, D., Leidenfrost dynamics, Annu. Rev. Fluid Mech., 197-215 (2013).
Quéré, D., Non-sticking drops, Institute of Physics Publishing, Rep. Prog. Phys., 68(11):2495-2532 (2005).
Rausch et al., On the Characteristics of Ion Implanted Metallic Surfaces Inducing Dropwise Condensation of Steam, Langmuir, 26(8): 5971-5975 (2010).
Reyssat et al., Dynamical superhydrophobicity, Faraday Discussions, 146:19-33 (2010).
Reyssat, et al., Bouncing transitions on microtextured materials, Europhysics Letters, 74(2):306-312 (2006).
Richard, D. et al., Contact time of a bouncing drop, Nature 417:(6891):811 (2002).
Roosen et al., Optical levitation by means of two horizontal laser beams: a theoretical and experimental study, Physics Letters A, 59(1):6-8 (1976).
Rothstein, J. P., Slip on superhydrophobic surfaces, ANRV400-FL42-05, ARI, 89-109 (2010).
Rykaczewski et al., Mechanism of Frost Formation of Lubricant-Impregnated Surfaces, Langmuir 2013, 29 5230-5238, 13 pages.
Schierbaum, Klaus-Dieter, Ordered ultra-thin cerium oxide overlayers on Pt(111) single crystal surfaces studied by LEED and XPS, Surface Science, 399:29-38, (1998).
Seiwert et al., Coating of a Textured Solid, J. Fluid Mech., 2011, 669: 55-63.
Sekeroglu et al., Transport of a soft cargo on a nanoscale ratchet, Applied Physics Letters, 99(6) (2011).
Smith et al., Droplet Mobility on Lubricant-Impregnated Surfaces, Soft Matter, 2012(9): 1772-1780 (2012).
Smith et al., Liquid-encapsulating surfaces: overcoming the limitations of superhydrophobic surfaces for robust non-wetting and anti-icing surfaces, in Bulletin of the American Physical Society (2011) Abstract Only.
Snoeijer et al., Maximum size of drops levitated by an air cushion, Physical Review E—Statistical, Nonlinear, and Soft Matter Physics, 79(3) (2009).
Song et al., Superhydrophobic Surfaces Produced by Applying a Self-Assembled Monolayer to Silicon Micro/Nano-Textured Surfaces, Nano Research, 2009, 2: 143-150.
Song et al., Vitrification and levitation of a liquid droplet on liquid nitrogen, PNAS Early Edition, pp. 1-5 (2010).
Sutara, F. et al., Epitaxial growth of continuous $CeO_2(111)$ ultra-thin films on Cu(111), Thin Solid Films, 516:6120-6124 (2008).
Synytska et al., Perfluoroalkyl End-Functional Oligoesters: Correlation between Wettability and End-Group Segregation, Macromolecules, 40, 297-305, (2007).
Trinh et al., The dynamics of ultrasonically levitated drops in an electric field, Physics of Fluids, 8(1):43-61 (1996).
Tuteja et al., Designing superoleophobic surfaces, Science, 318(5856):1618-1622 (2007).
Tuteja et al., Robust omniphobic surfaces, Proceedings of the National Academy of Sciences of the United States of America, 105(47):18200-18205 (2008).
Vakarelski et al., Drag reduction by leidenfrost vapor layers, Physical Review Letters, 106(21) (2011).
Vakarelski et al., Stabilization of Leidenfrost vapour layer by textured superhydrophobic surfaces, Nature, 489(7415):274-277 (2012).
Varanasi et al., Frost formation and ice adhesion on superhydrophobic surfaces, Applied Physics Letters, 97(23) (2010).
Varanasi et al., Spatial Control in the Heterogeneous Nucleation of Water, Applied Physics Letters, 95: 094101-01-03 (2009).
Weber et al., Aero-acoustic levitation: A method for containerless liquid-phase processing at high temperatures, Review of Scientific Instruments, 65(2):456-465 (1994).
Weickgenannt et al., Inverse-Leidenfrost phenomenon on nanofiber mats on hot surfaces, Physical Review E—Statistical, Nonlinear, and Soft Matter Physics, 84(3) (2011).
Weilert et al., Magnetic levitation and noncoalescence of liquid helium, Physical Review Letters, 77(23):4840-4843 (1996).
Welter et al., Acoustically levitated droplets—A new tool for micro and trace analysis, Fresenius' Journal of Analytical Chemistry, 357(3):345-350 (1997).
Wenzel, Resistance of Solid Surfaces to Wetting by Water, Industrial & Engineering Chemistry, 28(8): 988-994 (1936).
Wong et al., Bioinspired Self-Repairing Slippery Surfaces with Pressure-Stable Omniphobicity, Nature, 477(7365):443-447 (2011).
Written Opinion, PCT/US14/16621, mailed Jun. 13, 2014, 7 pages.
Written Opinion, PCT/US2011/061898, Apr. 24, 2013, 9 pages.
Written Opinion, PCT/US2012/030370, Oct. 15, 2012, 10 pages.
Written Opinion, PCT/US2012/042326, Dec. 3, 2012, 7 pages.
Written Opinion, PCT/US2012/042327, May 16, 2013, 6 pages.
Written Opinion, PCT/US2013/021558, Oct. 11, 2013, 7 pages.
Written Opinion, PCT/US2013/028439, Dec. 5, 2013, 11 pages.

(56) References Cited

OTHER PUBLICATIONS

Written Opinion, PCT/US2013/042771, May 26, 2014, 7 pages.
Written Opinion, PCT/US2013/045731, Nov. 12, 2013, 3 pages.
Written Opinion, PCT/US2013/070827, Mar. 27, 2014, 15 pages.
Würger, A., Leidenfrost gas ratchets driven by thermal creep, Physical Review Letters, 107(16) (2011).
Yagüe and Gleason, Enhanced Cross-Linked Density by Annealing on Fluorinated Polymers Synthesized via Initiated Chemical Vapor Deposition To Prevent Surface Reconstruction, Macromolecules, 46:6548-6554, (2013).
Yagüe and Gleason, Vapor Deposition of Fluoropolymer Surfaces, Handbook of Fluoropolymer Science and Technology, pp. 131-148, (2014).
Yang et al., Organic Vapor Passivation of Silicon at Room Temperature, Adv. Mater., (2013).
Yarin et al., On the acoustic levitation of droplets, Journal of Fluid Mechanics, 356:65-91 (1998).
Yasuda et al., Levitation of metallic melt by using the simultaneous imposition of the alternating and the static magnetic fields, Journal of Crystal Growth, 260(3-4):475-485 (2004).
Yu et al., Containerless solidification of oxide material using an electrostatic levitation furnace in microgravity, Journal of Crystal Growth, 231(4):568-576 (2001).
Zhao et al., Dropwise condensation of Steam on Ion Implanted Condenser Surfaces, Heat Recovery Systems & CHP, 14(5): 525-534 (1994).
Asatekin, A et al., "Polymeric Nanopore Membranes for Hydrophobicity-Based Separations by Conformal Initiated Chemical Vapor Deposition," Nano Lett., 11:677-86 (2011).
Jang, J et al., "Facile Fabrication of Inorganic-Polymer Core-Shell Nanostructures by a One-Step Vapor Deposition Polymerization," Angew. Chem. Int. Ed., 42:5600-3 (2003).
Petruczok, C et al., "Abstract: Systematic Tuning of Cross-Linking in Vapor-Deposited Polymer Thin Films," AlChe (2012).
Petruczok, C et al., "Controllable Cross-Linking of Vapor-Deposited Polymer Thin Films and Impact on Material Properties," Macromolecules, 46:1832-40 (2013).

* cited by examiner

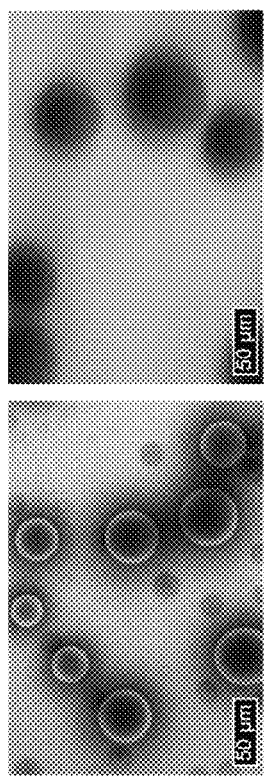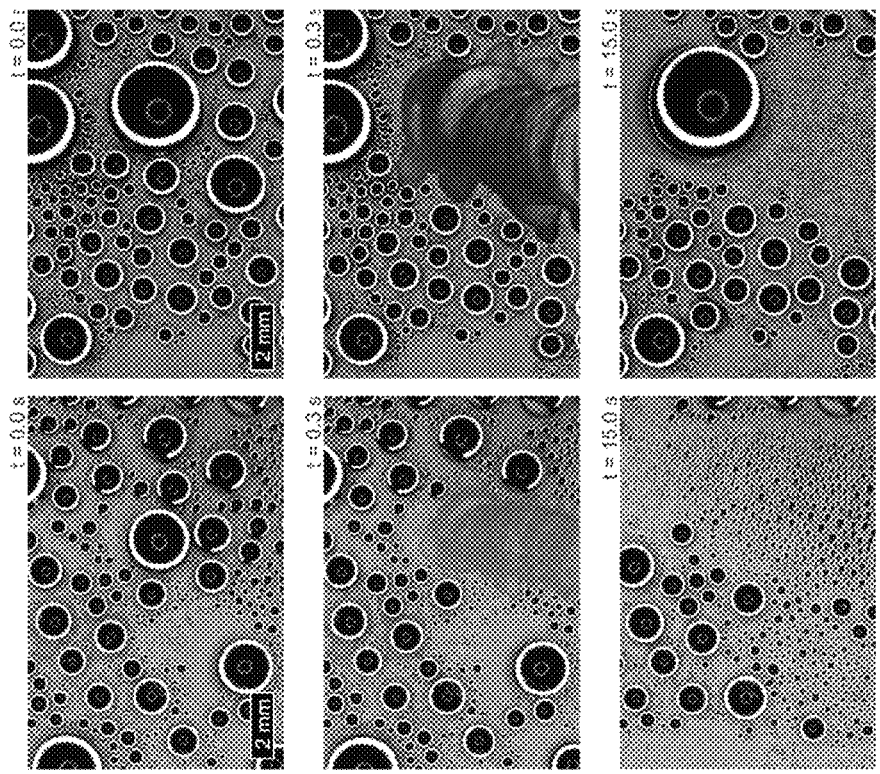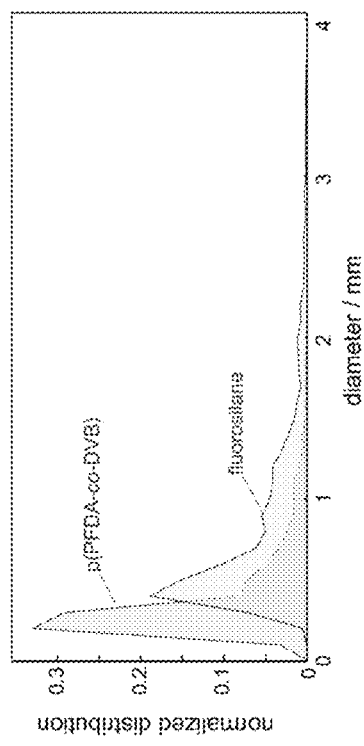
FIG. 2a  FIG. 2b  FIG. 2c  FIG. 2d  FIG. 2e

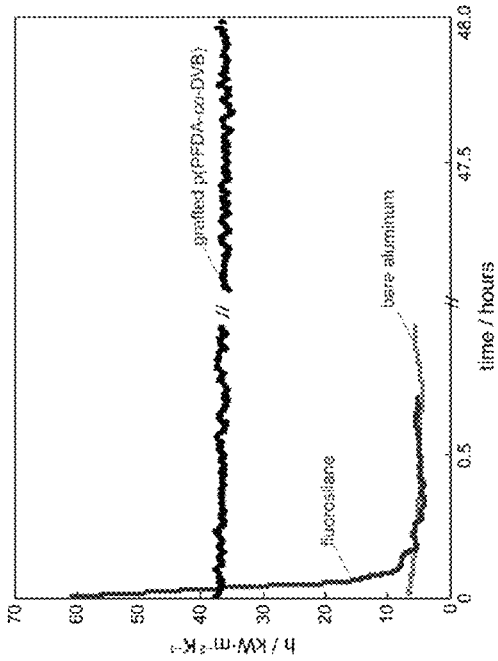
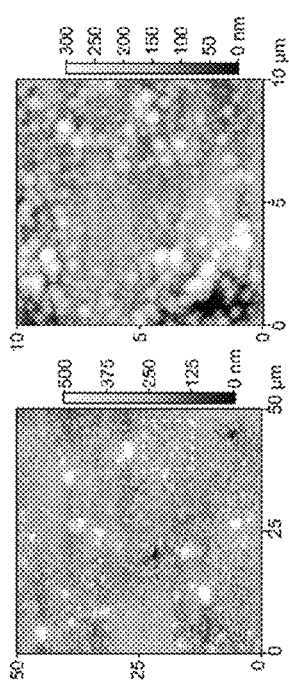
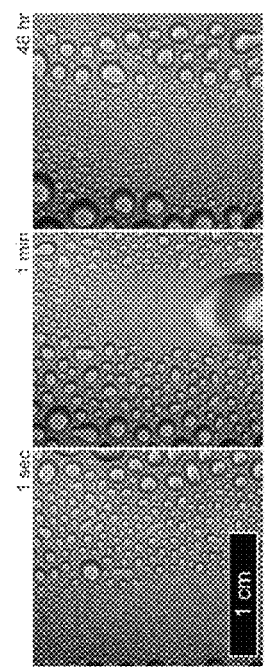
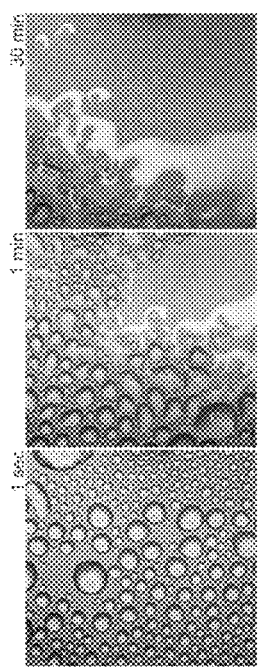

Contact Angle

PFDA (°)

|  | Advancing | Receding | Hysteresis |
|---|---|---|---|
| Water | 140±0.2 | 117±1.8 | 24±1.9 |
| Mineral oil | 91±0.15 | 64±1.4 | 26±1.5 |

PFDA-DVB_2 (0.2-1)

|  | Advancing | Receding | Hysteresis |
|---|---|---|---|
| Water | 146±2.2 | 129±1.7 | 16±3.2 |
| Mineral oil | 94±0.7 | 69±0.6 | 25±1.1 |

PFDA-DVB_3 (0.2-0.6)

|  | Advancing | Receding | Hysteresis |
|---|---|---|---|
| Water | 140±5.8 | 125±3.4 | 16±3.3 |
| Mineral oil | 96±0.6 | 64±0.7 | 32±1.3 |

PFDA-DVB_4 (0.2-0.2)

|  | Advancing | Receding | Hysteresis |
|---|---|---|---|
| Water | 135±0.9 | 117±3.1 | 18±3.6 |
| Mineral oil | 90±0.05 | 73±0 | 17±0.05 |

PFDA-DVB_1 (0.1-0.1) 13/03/12

|  | Advancing | Receding | Hysteresis |
|---|---|---|---|
| Water | 142±3.2 | 115±1.5 | 28±2.9 |
| Mineral oil | 98±0.3 | 60±0.9 | 38±0.7 |

DVB

|  | Advancing | Receding | Hysteresis |
|---|---|---|---|
| Water | 93±0.5 | 58±0.5 | 34.7±0 |
| Mineral oil | 28±1.8 | 19±2.2 | 9±3.4 |

PFDA thermal

|  | Advancing | Receding | Hysteresis |
|---|---|---|---|
| Water | 140±2.1 | 111±1.0 | 29±2.0 |
| Mineral oil | 90±2.3 | 66±4.9 | 24±4.3 |

PFDA-DVB_2_thermal

|  | Advancing | Receding | Hysteresis |
|---|---|---|---|
| Water | 139±1.3 | 129±1.2 | 10±1.9 |
| Mineral oil | 91±1.3 | 82±1.9 | 8±2.8 |

PFDA-DVB_3_thermal

|  | Advancing | Receding | Hysteresis |
|---|---|---|---|
| Water | 132±1 | 127±1.2 | 5±0.9 |
| Mineral oil | 85±0.2 | 85±0.5 | 0.3±0.2 |

PFDA-DVB_4_thermal

|  | Advancing | Receding | Hysteresis |
|---|---|---|---|
| Water | 124±0.5 | 118±1.5 | 6±1.4 |
| Mineral oil | 84±0.4 | 83±0.5 | 1±0.2 |

PFDA-DVB_1 13/03/12_thermal

|  | Advancing | Receding | Hysteresis |
|---|---|---|---|
| Water | 122±0.6 | 116±1.7 | 6±1.4 |
| Mineral oil | 93±0.6 | 79±0.7 | 14±1.2 |

FIG. 11

| surface | Δθ [°] | $r_{max}$ [mm] |
|---|---|---|
| fluorosilane | 26.7 ± 1.5 | 2.4 ± 0.1 |
| PFDA-co-DVB | 11.0 ± 1.0 | 1.6 ± 0.6 |

GRAFTED POLYMER SURFACES FOR DROPWISE CONDENSATION, AND ASSOCIATED METHODS OF USE AND MANUFACTURE

RELATED APPLICATIONS

This application is a continuation of U.S. Non-Provisional patent application Ser. No. 14/181,586, filed on Feb. 14, 2014, which claims priority to and the benefit of U.S. Provisional Patent Application No. 61/876,195, filed Sep. 10, 2013, U.S. Provisional Patent Application No. 61/874,941, filed Sep. 6, 2013, and U.S. Provisional Patent Application No. 61/765,679, filed Feb. 15, 2013, the contents of which are hereby incorporated by reference herein in their entireties.

GOVERNMENT SUPPORT

This invention was made with government support under Contract No. W911NF-07-D-0004 awarded by the Army Research Office. The government has certain rights in the invention.

FIELD OF THE INVENTION

This invention relates generally to grafted polymer surfaces and their use for enhanced heat transfer, improved dropwise condensation, and/or reduced adhesion of liquids and solids thereto.

BACKGROUND OF THE INVENTION

Vapors condense upon a surface if the surface is cooled below the saturation temperature at a given pressure. The condensed liquid phase may accumulate on the surface as a film and/or as droplets or islands of liquid. Condensation is critical in many industrial applications, although in certain applications, it is useful to inhibit or prevent the filmwise buildup of condensing liquid on a surface by promoting droplet shedding and enhancing dropwise condensation.

Condensation of water is a crucial process in many industries, including power generation and desalination. Roughly 85% of the global installed base of electricity generation plants and 50% of desalination plants worldwide rely on steam surface condensers, a type of heat exchanger in which a plurality of tubes flowing coolant contact steam on their outside surface. Given the widespread scale if these processes, even slight improvements in cycle efficiencies will have a significant effect on global energy consumption.

One useful measure of heat transfer performance for a condenser is the heat transfer coefficient, defined as the flux per area in units of $kW/m^2K$. Heat transfer coefficients experienced when condensing in the dropwise mode are an order of magnitude greater than those in the filmwise mode. The presence of an insulating liquid film during filmwise condensation presents a significant thermal barrier to heat transfer, whereas the departure of discrete drops during dropwise condensation exposes the condensing surface to vapor. The higher heat transfer coefficients experienced during dropwise condensation make it attractive for employing in large-scale thermal fluids applications such as steam power plants and desalination plants, as well as small-area high-heat flux applications such as electronics cooling. However, the practical implementation of dropwise condensation in power generation, desalination, and other applications has been a significant materials challenge, limited by, among other factors, durability of existing hydrophobic functionalization for metal heat transfer surfaces. While metals provide both high thermal conductivity for maximizing heat transfer and high tensile strength to minimize the need for structural supports, metals are typically wetted by water and most other thermal fluids, and, as a result, metals exhibit filmwise condensation. In order for a metal surface to exhibit desired dropwise condensation, the surface that is used for heat transfer needs to be modified. One way to achieve dropwise condensation on a metal surface where heat transfer takes place is to modify the metal surface with a hydrophobic coating.

A number of conventional techniques have been employed previously to promote dropwise condensation on surfaces, including the use of monolayer promoters such as oleic acid and stearic acid (U.S. Pat. No. 2,919,115), noble metals (U.S. Pat. No. 3,289,753 and U.S. Pat. No. 3,289,754 and U.S. Pat. No. 3,305,007), ion-implanted metal (U.S. Pat. No. 6,428,863), as well as thin films of polymers applied via sputtering or dip-coating (U.S. Pat. No. 2,923,640, U.S. Pat. No. 3,899,366, EP2143818 A1, U.S. Pat. No. 3,466,189). However, previous methods suffer from problems such as low durability and/or high cost. Moreover, most of these hydrophobic modifiers, and especially the silane-based modifiers that have been used in some conventional methods, are not robust in steam environments of industrial interest (in other words, these modifiers cannot withstand the environments in which they are used). Previous methods also do not adequately promote rapid droplet shedding because they do not sufficiently reduce the contact angle hysteresis. It is possible to have a surface with a high contact angle but also high adhesion, so even though condensation would initiate in the dropwise regime, it would ultimately progress to filmwise condensation because the drops are not able to shed easily.

Furthermore, where the condensing liquids are hydrocarbons or other low-surface tension liquids, the problem of film-wise condensation is exacerbated. Current surfaces designed for dropwise condensation of water do not promote dropwise condensation of low-surface tension hydrocarbon liquids such as n-alkanes (e.g., octane, hexane, heptane, pentane, butane) and refrigerants (e.g., fluorocarbons, chlorofluorocarbons, hydrochlorofluorocarbons) and cryogenic liquids (e.g., LNG, C2, N2, CO2, methane, propane).

Some conventional methods have used nanotextured surface to improve condensation heat transfer, however, these methods also rely on silane or thiol modifiers to modify the wettability of a nanotextured surface from superhydrophilic to superhydrophobic, and thus these nanotextured surfaces are subject to the same robustness concerns discussed above. Additionally, because the thermal conductivities of polymeric materials are typically orders of magnitude smaller than those of a typical metal substrate, the thickness of the polymer modifier is extremely important. Hence, there is currently a need for an ultra-thin robust hydrophobic modifier that may be applied over a metal surface to enhance heat transfer.

There is a need for methods and articles/devices for improved heat transfer and/or dropwise condensation of low-surface tension liquids, including hydrocarbon liquids.

SUMMARY OF THE INVENTION

Presented herein are articles and methods featuring substrates with thin, uniform polymeric films grafted thereupon. Techniques such as iCVD allow deposition of precisely-controlled, extremely thin polymeric films on metal substrates, where the polymer is covalently bonded to the substrate. Furthermore, the polymeric film may be cross-linked at or near its exposed surface and/or throughout the bulk of the film via annealing. The resulting coating exhibits significant reductions in thermal resistance, drop shedding size, and degradation rate during dropwise condensation of steam compared to existing coatings.

Articles and methods presented herein relate to the use of ecofriendly monomers (e.g., 1H,1H,2H,2H-perfluorooctyl acrylate (C6)) for iCVD. C6 monomers undergo surface group reorganization, which is undesirable. Articles and methods presented herein relate to overcoming the surface group organization via crosslinking and/or graded structure. In some embodiments, 1H,1H,2H,2H-perfluorooctyl acrylate as well as C6 monomers with alternative chemistries are deposited via iCVD as precisely-controlled, extremely thin polymeric films on metal substrates, where the polymer becomes covalently bonded to the substrate.

In some embodiments, the invention relates to an article for enhanced heat transfer, and/or mitigating phase transition and nucleation of undesired materials, and/or reducing adhesion of liquids and solids thereupon, the article comprising a substrate and a (e.g., thin, uniform) polymeric film grafted (e.g., covalently bonded) thereupon.

In some embodiments, the substrate comprises a metal (e.g., steel, stainless steel, titanium, nickel, copper, aluminum, molybdenum, and/or alloys thereof). In some embodiments, the substrate comprises a polymer (e.g., polyethylene, polyvinylchloride, polymethylmethacrylate, polyvinylidene fluoride, polyester, polyurethane, polyanhydride, polyorthoester, polyacrylonitrile, polyphenazine, polyisoprene, synthetic rubber, polytetrfluoroethylene, polyethylene terephthalate, acrylate polymer, chlorinated rubber, fluoropolymer, polyamide resin, vinyl resin, expanded polytetrafluoroethylene, low density polyethylene, high density polyethylene, and/or polypropylene). In some embodiments, the substrate comprises a semiconductor and/or ceramic (e.g., SiC, Si, AlN, GaAs, GaN, ZnO, Ge, SiGe, BN, BAs, AlGaAs, $TiO_2$, TiN, etc.). In some embodiments, the substrate comprises a rare earth element or compound comprising a rare earth element (e.g., a rare earth oxide, carbide, nitride, fluoride, or boride; e.g., cerium oxide $CeO_2$).

In some embodiments, the polymeric film comprises a fluoropolymer. In some embodiments, the polymeric film is formed from at least one monomer species comprising one or more pendant perfluorinated alkyl moieties. In some embodiments, the fluoropolymer has at least one $CF_3$ group. In some embodiments, the fluoropolymer comprises polytetrafluoroethylene (PTFE). In some embodiments, the fluoropolymer comprises $[C_{12}H_9F_{13}O_2]_n$, where n is an integer greater than zero.

In some embodiments, the fluoropolymer comprises a member selected from the group consisting of poly(3,3,4,4,5,5,6,6,7,7,8,8,8-tridecafluorooctyl methacrylate), poly(1H,1H,2H,2H-perfluorooctyl acrylate), poly([N-methyl-perfluorohexane-1-sulfonamide]ethyl acrylate), poly([N-methyl-perfluorohexane-1-sulfonamide]ethyl (meth) acrylate), poly(2-(Perfluoro-3-methylbutyl)ethyl methacrylate)), poly(2-[[[[2-(perfluorohexyl)ethyl]sulfonyl] methyl]-amino]ethyl]acrylate), poly(2-[[[[2-(perfluoroheptyl)ethyl]sulfonyl]methyl]-amino]ethyl]acrylate), poly(2-[[[[2-(perfluorooctyl)ethyl]sulfonyl]methyl]-amino]ethyl] acrylate), and any copolymer thereof.

In some embodiments, the fluoropolymer is a C6 analog of PFDA. In some embodiments, the fluoropolymer comprises poly(2-(Perfluoro-3-methylbutyl)ethyl methacrylate), or any copolymer comprising 2-(Perfluoro-3-methylbutyl) ethyl methacrylate, wherein the fluoropolymer is cross-linked.

In some embodiments, the polymeric film comprises at least one member selected from the group consisting of polytetrafluoroethylene (PTFE), poly(perfluorodecylacrylate) (PFDA), polymethylmethacrylate (PMMA), polyglycidylmethacrylate (PGMA), poly-2-hydroxyethylmethacrylate, poly(perfluorononyl acrylate), poly(perfluorooctyl acrylate), and any copolymer thereof. In some embodiments, the polymeric film comprises a copolymer of two or more monomer species.

In some embodiments, the polymeric film comprises cross-linked polymer and/or cross-linked copolymer. In some embodiments, the polymeric film is cross-linked with a crosslinking agent comprising an organic molecule having at least two vinyl moieties. In some embodiments, the polymeric film is cross-linked with a crosslinking agent comprising at least one member selected from the group consisting of: diethyleneglycol divinyl ether, diethyleneglycol dimethacrylate, diethyleneglycol diacrylate, and/or 1H,1H,6H,6H-perfluorohexyldiacrylate. In some embodiments, the polymeric film is cross-linked with divinyl benzene (DVB). In some embodiments, the polymeric film is cross-linked with a member selected from the group consisting of ethylene dimethyacrylate (EDMA), di(ethyleneglycol)di(methacrylate), di(ethyleneglycol)di(acrylate), ethyleneglycoldimethyacrylate (EGDMA), di(ethyleneglycol)di(vinylether) (EDGDVE), and 1H,1H,6H,6H-perfluorohexyldiacrylate.

In some embodiments, the polymeric film comprises from 0 wt. % to 99 wt. % crosslinking agent (e.g., from 5 wt. % to 90 wt. %; from 15 wt. % to 85 wt. %; from 25 wt. % to 75 wt. %; from 35 wt. % to 65 wt. %; or from 45 wt. % to 55 wt. %).

In some embodiments, the polymeric film has non-uniform concentration of crosslinking agent along the thickness of the film. In some embodiments, the polymeric film is covalently bonded to the substrate. In some embodiments, the polymeric film is covalently bonded to the substrate by attachment of a vinyl precursor to the substrate, thereby forming a surface comprising a plurality of pendant vinyl moieties. In some embodiments, the vinyl precursor is a member selected from the group consisting of a vinyl functional silane, a vinyl functional phosphonic acid, and a vinyl functional thiol.

In some embodiments, the vinyl precursor comprises at least one member selected from the group consisting of trichlorovinylsilane, bis(triethoxysilylethyl)vinylmethyl-silane, bis(triethoxysilyl)ethylene, bis(trimethoxysilylmethyl) ethylene, 1,3-[bis(3-triethoxysilylpropyl)poly-ethylenoxy]-2-methylenepropane, bis[(3-trimethoxysilyl)propyl]-ethylenediamine, bis[3-(triethoxysilyl)propyl]-disulfide, 3-mercaptopropyltrimethoxysilane, and vinyl phosphonic acid.

In some embodiments, the polymeric film is no greater than 500 nm in thickness (e.g., no greater than 400 nm, no greater than 300 nm, no greater than 200 nm, no greater than 100 nm, no greater than 75 nm, no greater than 50 nm, no greater than 25 nm, or no greater than 15 nm, e.g., as thin as 10 nm). In some embodiments, the polymeric film comprises a grafting layer (e.g., where the polymeric film is covalently bonded to the substrate) and a bulk film layer (e.g., where the grafting layer has a thickness from about 0.5 nm to about 5 nm, or from about 1 nm to about 3 nm, or from about 1 nm to about 2 nm). In some embodiments, the polymer film has a thickness variation of no greater than about 20% (e.g., no greater than about 15%, no greater than about 10%, or no greater than about 5%—e.g., the polymer film is uniform).

In some embodiments, the polymer film has a texture comprising micro- and/or nano-scale features (e.g., ridges, grooves, pores, posts, bumps, and/or protrusions, patterned and/or unpatterned). In some embodiments, the substrate is textured and wherein the polymeric film conforms to the textured substrate surface. In some embodiments, the substrate is textured with micro- and/or nano-scale surface textures (e.g., posts, ridges, cavities, pores, posts, protrusions, etc.). In some embodiments, the polymeric film has a crystalline or semicrystalline surface (e.g., formed via annealing, but not necessarily via annealing).

In some embodiments, the polymeric film has a surface (e.g., exposed surface) with low contact angle hysteresis (e.g., no greater than 50°, no greater than 40°, no greater than 30°, no greater than 25°, no greater than 20°, no greater than 15°, or no greater than 10°, or no greater than 5°, or no greater than 1° for water; and no greater than 20°, no greater than 15°, no greater than 10°, no greater than 5°, or no greater than 1° for hydrocarbons, refrigerants, cryogenic liquids, and other low-surface tension liquids, where contact angle hysteresis is the difference between advancing contact angle and receding contact angle).

In some embodiments, the polymeric film has a surface (e.g., exposed surface) with high advancing contact angle (e.g., no less than 70°, no less than 80°, no less than 90°, no less than 100°, no less than 120°, no less than 130°, no less than 140° for water; and no less than 30°, no less than 40°, no less than 50°, no less than 60°, no less than 70°, no less than 80°, no less than 90°, no less than 100° for hydrocarbons, refrigerants, cryogenic liquids, and other low-surface tension liquids) and/or high receding contact angle (e.g., no less than 60°, no less than 70°, no less than 80°, no less than 90°, no less than 100°, no less than 110°, or no less than 120° for water; and no less than 20°, no less than 30°, no less than 40°, no less than 50°, no less than 60°, no less than 70°, no less than 80°, no less than 90° for hydrocarbons, refrigerants, cryogenic liquids, and other low-surface tension liquids).

In some embodiments, the article is a condenser (e.g., where dropwise condensation is promoted on the surface of the polymeric film for enhanced heat transfer). In some embodiments, the article is a cooling device for an electronic and/or photonic component (e.g., where heat transfer is promoted from the electronic or photonic component to the surface of the polymeric film, wherein the polymeric film is in contact with the component, and/or wherein the polymeric is in contact with a fluid that is in contact with the component).

In some embodiments, the article is flexible. In some embodiments, the substrate and the polymeric film grafted thereupon is flexible. In some embodiments, the article is retrofitted to form the grafted polymeric film.

In another aspect, the invention is directed to a method for using the article described in any of the above embodiments, wherein the method comprises contacting an exposed surface of the polymeric film with a Thermal Interface Material (TIM) (e.g., a thermally conductive material used between microprocessors and heatsinks to increase thermal transfer efficiency).

In some embodiments, the polymeric film comprises a polymer and/or copolymer, the polymer and/or copolymer comprising at least one perfluorinated pendant chain (e.g., a perfluorinated acrylate and/or a perfluorinated cyclic group, e.g., with 4 to 6 carbons in the ring), a spacer group, and a vinyl-based backbone group.

In some embodiments, the method includes contacting an exposed surface of the polymeric film with a Thermal Interface Material (TIM) (e.g., a thermally conductive material used between microprocessors and heatsinks to increase thermal transfer efficiency).

In some embodiments, the invention is directed to a method of preparing an article (e.g., the article described in any of the above embodiments), the method including the step of performing hot wire CVD (HWCVD) to produce the polymeric film grafted on the substrate. In some embodiments, the step of performing HWCVD comprises performing initiated chemical vapor deposition (iCVD) to produce the polymeric film grafted on the substrate.

In some embodiments, the method further includes the step of annealing the polymeric film by exposure to heat (e.g., to increase crosslinking density and/or degree of crystallinity of the polymeric film). In addition, in some embodiments, annealing can reduce hysteresis, increase crystallinity at interface, and increase crosslinking at the exposed interface.

In some embodiments, the HWCVD step is performed to retrofit an existing article (e.g., a condenser, boiler or other heat transfer surface in an HVAC device, a power plant, a desalination plant, a natural gas liquefaction ship, etc.) by grafting the polymeric film upon a surface thereof.

In some embodiments, the article is a Thermal Interface Material (TIM).

In some embodiments, the polymeric film has an exposed surface with critical surface energy no greater than 18 mN/m. In some embodiments, the polymeric film has an exposed surface with critical surface energy no greater than 6 mN/m.

In some embodiments, the polymeric film has an exposed surface with contact angle hysteresis no greater than 25° for water, hydrocarbons, refrigerants, cryogenic liquids, and other heat transfer fluids. In some embodiments, the exposed surface has contact angle hysteresis no greater than 1° or no greater than 5° for water, hydrocarbons, refrigerants, cryogenic liquids, and other heat transfer fluids.

In some embodiments, the polymeric film has RMS roughness no greater than 100 nm (e.g., no greater than 100 nm, no greater than 75 nm, no greater than 50 nm).

In some embodiments, the polymeric film provides dropwise condensation and shedding of a hydrocarbon, refrigerant, cryogenic liquid, water, or other low-surface tension liquid. In some embodiments, the hydrocarbon liquid is a member selected from the group consisting of alkanes, alkenes, alkynes, and fuel mixtures (e.g., gasoline, kerosene, diesel, fuel oil); the refrigerant is a member selected from the group consisting of chlorofluorocarbons, hydrofluorocarbons, and hydrochlorofluorocarbons; and the cryogenic liquid is selected from the group consisting of $N_2$, $O_2$, $CO_2$, He, LNG, methane, butane, propane, and isobutene. In certain embodiments, the hydrocarbon liquid is a member selected from the group consisting of hexane, toluene, isopropanol, ethanol, octane, pentane, and perfluorohexane.

In some embodiments, the hydrocarbon liquid has surface tension no greater than 30 mN/m (e.g., no greater than 28 mN/m, no greater than 21 mN/m, no greater than 18 mN/m, no greater than 16 mN/m, or no greater than 12 mN/m, or no greater than 6 mN/m).

In some embodiments, the article is a component (e.g., vessel, pipe, fin, etc.) of a condenser that comes into contact with a condensing liquid (e.g., working fluid). In some embodiments, the article is a component of an oil and/or gas processing apparatus (e.g. fractionation column, liquefaction device). In some embodiments, the article is (or is a component of) a power line, a turbine, an aircraft, a pipeline, a boiler, a windshield, a solar panel, industrial machinery, cookware, a consumer electronic device, a printed circuit board, an electronic component, or a medical device.

Another aspect discussed herein relates to a method for manufacturing a surface for promoting dropwise condensation and/or shedding of a liquid, the method including the steps of: providing a substrate; and controllably depositing a polymeric film on the substrate via initiated chemical vapor deposition (iCVD).

In some embodiments, the method includes depositing a vinyl precursor on the substrate prior to, or concurrently with, depositing the polymeric film. In some embodiments, the method includes modulating an average roughness of the deposited layer (e.g., such that roughness is no greater than 100 nm, or no greater than 75 nm, or no greater than 50 nm). In some embodiments, the modulating includes monitoring a degree of crystallization of the deposited polymeric film; or controlling the proportion of crosslinker; or controlling a temperature of the substrate during deposition; or any combination thereof.

In some embodiments, the deposited polymeric film has an average thickness from 1 nm to 1 micron. In some embodiments, the deposited polymeric film has an average thickness from 1 nm to 100 nm.

In some embodiments, the substrate comprises one or more materials selected from the group consisting of a metal (e.g., copper, brass, stainless steel, aluminum, aluminum bronze, nickel, iron, nickel iron aluminum bronze, titanium, scandium, and any alloys thereof), polymer, glass, rubber, silicon, polycarbonate, PVC, ceramic, semiconductor, and any combinations thereof. In some embodiments, the substrate comprises one or more materials selected from the group consisting of plastic, silicon, quartz, woven or nonwoven fabric, paper, ceramic, nylon, carbon, polyester, polyurethane, polyanhydride, polyorthoester, polyacrylonitrile, polyphenazine, polyisoprene, synthetic rubber, polytetrfluoroethylene, polyethylene terephthalate, acrylate polymer, chlorinated rubber, fluoropolymer, polyamide resin, vinyl resin, expanded polytetrafluoroethylene, low density polyethylene, high density polyethylene, and polypropylene.

In some embodiments, the polymeric film has an exposed surface with critical surface energy no greater than 18 mN/m. In some embodiments, the polymeric film has an exposed surface with critical surface energy no greater than 6 mN/m.

In some embodiments, the polymeric film has an exposed surface with contact angle hysteresis no greater than 25°. In some embodiments, the exposed surface has contact angle hysteresis no greater than 5° for water, hydrocarbons, refrigerants, cryogenic liquids, and other heat transfer fluids, or any combination thereof.

In some embodiments, the polymeric film has roughness no greater than 100 nm (e.g., no greater than 100 nm, no greater than 75 nm, no greater than 50 nm).

In some embodiments, the polymeric film provides dropwise condensation and shedding of a hydrocarbon, refrigerant, cryogenic liquid, water, other low-surface tension liquids, or any combination thereof. In some embodiments, the hydrocarbon liquid is a member selected from the group consisting of alkanes, alkenes, alkynes, and fuel mixtures (e.g., gasoline, kerosene, diesel, fuel oil); the refrigerant is a member selected from the group of chlorofluorocarbons, hydrofluorocarbons, and hydrochlorofluorocarbons; and the cryogenic liquid is selected from the group consisting of N2, O2, CO2, LNG, methane, propane, isobutene, and any combination thereof. In some embodiments, the hydrocarbon liquid has surface tension no greater than 30 mN/m (e.g., no greater than 28 mN/m, no greater than 21 mN/m, no greater than 18 mN/m, no greater than 16 mN/m, or no greater than 12 mN/m, or no greater than 6 mN/m).

Another aspect discussed herein relates to a method of manufacturing the polymeric film on the article of any of the aspects or embodiments discussed above.

Elements of embodiments described with respect to a given aspect of the invention may be used in various embodiments of another aspect of the invention. For example, it is contemplated that features of dependent claim depending from one independent claim can be used in apparatus, articles, systems, and/or methods of any of the other independent claims.

BRIEF DESCRIPTION OF THE DRAWINGS

The foregoing and other objects, aspects, features, and advantages of the invention will become more apparent and may be better understood by referring to the following description taken in conjunction with the accompanying drawings, in which:

FIG. 1b illustrates a schematic of a lab-scale 200 mm diameter iCVD reactor system. For a vinyl homopolymerization, a constant flow of monomer and initiator are metered into the 'pancake' style vacuum reaction chamber. An array of resistively heated wires, suspended a few centimeters above the substrate, heats the vapors. Laser inteferometry provides real time monitoring of the iCVD polymer thickness. The pressure of the chamber is controlled by a throttling value. An unreacted species and volatile reaction by-products are exhausted to a mechanical pump. For copolymerization, an additional monomer feed line would need to be added to the system. FIG. 1c shows a schematic cross-section of the iCVD reactor showing decomposition of the initiator by the heated filaments. Surface modification through polymerization of the monomer occurs on the actively cooled substrate.

FIGS. 2a-2e illustrate comparison of water condensation on p(PFDA-co-DVB) and fluorosilane coatings deposited on silicon substrates, in accordance with some embodiments of the present invention. Environmental scanning electron micrograph of condensation of pure saturated water vapor at 800 Pa and a supersaturation of 1.16±0.05, showing pre-coalescence behavior on copolymer (FIG. 2a) and comparing to condensation behavior on fluorosilane (FIG. 2b) surfaces, indicating higher nucleation density on copolymer surface. Photographs of condensation of water vapor in air at 40% R.H. on copolymer (FIG. 2c) and fluorosilane surfaces (FIG. 2d) immediately before and after a shedding event (top and middle photographs, respectively) and 15 seconds after the shedding event (bottom photograph), indicating smaller departing drop diameter on copolymer surface. FIG. 2(e) illustrates time-averaged normalized droplet diameter distributions. Smaller drop sizes on copolymer surface indicate better shedding behavior.

FIGS. 3a-3e illustrate surface topology and water vapor condensation on p(PFDA-co-DVB) coating deposited on an aluminum substrate, in accordance with some embodiments of the present invention. FIG. 3a illustrates 50×50 μm AFM height scan of surface topology. Dashed box indicates region of the image shown in FIG. 3b, 10×10 μm AFM height scan of surface topology. Photographs during condensation of saturated steam at 100° C. and 101 kPa of prolonged dropwise condensation on grafted coating over a period of 48 hours (FIG. 3c) and degradation of fluorosilane coating over a period of 30 min (FIG. 3d). FIG. 3e illustrates heat transfer coefficient of aluminum substrates with no coating, with a fluorosilane coating, and with a grafted p(PFDA-co-DVB) coating, plotted vs. time.

FIG. 5 (right) illustrates 10×10 μm AFM height scan of surface topology showing spherulitic texture. Dashed box indicates region of (e), 1×1 μm AFM phase scan of single roughness feature (bottom) and line height scan (top).

FIG. 11 shows contact angle measurements using water and mineral oil of the pPFDA homopolymer, the pDVB homopolymer and a series of p(PFDA-co-DVB) copolymers, for non-annealed (left) and annealed (right) samples.

FIG. 23a demonstrates how amorphous chains of C6 polymer reorient into the bulk and contribute to high CAH. FIG. 23b shows how steric hindrance afforded by DVB crosslinking restricts rearrangement of pendant groups into the bulk of the film, reducing CAH.

Figure 1A:
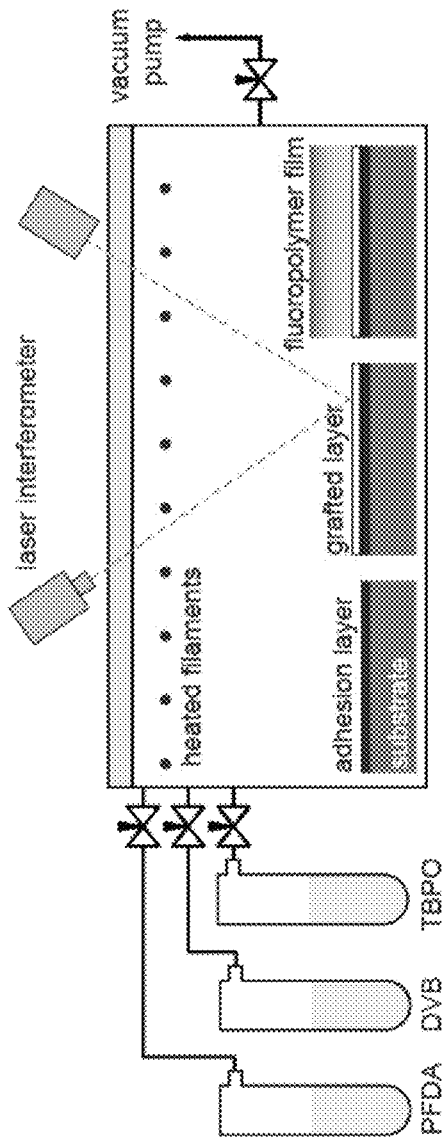
FIGS. 1a-1c illustrate iCVD reactor geometries and reaction processes, in accordance with certain embodiments of the invention.
Figure 1C:
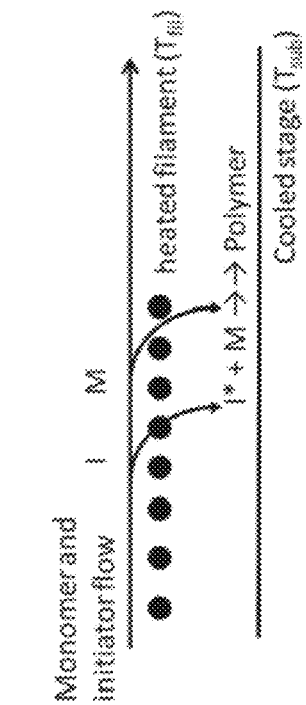

The features and advantages of the present disclosure will become more apparent from the detailed description set forth below when taken in conjunction with the drawings, in which like reference characters identify corresponding elements throughout. In the drawings, like reference numbers generally indicate identical, functionally similar, and/or structurally similar elements.

DESCRIPTION

It is contemplated that compositions, mixtures, systems, devices, methods, and processes of the claimed invention encompass variations and adaptations developed using information from the embodiments described herein. Adaptation and/or modification of the compositions, mixtures, systems, devices, methods, and processes described herein may be performed by those of ordinary skill in the relevant art.

Throughout the description, where articles, devices and systems are described as having, including, or comprising specific components, or where processes and methods are described as having, including, or comprising specific steps, it is contemplated that, additionally, there are articles, devices, and systems of the present invention that consist essentially of, or consist of, the recited components, and that there are processes and methods according to the present invention that consist essentially of, or consist of, the recited processing steps.

Similarly, where articles, devices, mixtures, and compositions are described as having, including, or comprising specific compounds and/or materials, it is contemplated that, additionally, there are articles, devices, mixtures, and compositions of the present invention that consist essentially of, or consist of, the recited compounds and/or materials.

It should be understood that the order of steps or order for performing certain actions is immaterial so long as the invention remains operable. Moreover, two or more steps or actions may be conducted simultaneously.

The mention herein of any publication, for example, in the Background section, is not an admission that the publication serves as prior art with respect to any of the claims presented herein. The Background section is presented for purposes of clarity and is not meant as a description of prior art with respect to any claim.

Presented herein are articles and methods featuring substrates with thin, uniform polymeric films grafted thereupon. An exposed surface of the film is configured for contact with a liquid, another solid, a vapor, and/or a combined vapor and liquid—that is, there is either a solid-liquid interface, a solid-solid interface, solid-vapor interface, or a solid-vapor/liquid interface at the surface of the grafted polymeric film. The polymeric film may be tuned to have a precise thickness and uniformity. For example, a thickness of less than about 200 nm, less than about 150 nm, less than about 100 nm, less than about 80 nm, less than about 50 nm, less than about 20 nm, or even less than about 10 nm, and the variation of the film thickness of the surface may be less than 20%, less than 15%, less than 10%, or less than 5%.

Methods are provided herein to graft this uniform polymeric film onto a wide variety of substrate materials. For example, traditional engineering materials such as stainless steel, titanium, nickel, copper, aluminum, magnesium and/or oxides and/or alloys thereof may be coated by a thin conformal film of polymer to obtain a surface that exhibits robust dropwise condensation. According to some embodiments of the present invention, semiconductors such as Si, SiC, AN, GaAs, ceramics such as TiN, TiC, Sic, SiN, TiO2, and rare-earth oxides can be coated as well. Methods are also provided to provide a film with controllable thickness and morphology. For example, in certain embodiments, the film is a conformal film on a textured substrate. In other embodiments, the film is a conformal film on a smooth surface. In other embodiments, the film is a textured film on a smooth surface.

A film may include or be a thin hydrophobic polymer/copolymer film. Techniques such as initiated chemical vapor deposition (hereafter, "iCVD") allow deposition of precisely-controlled, extremely thin (e.g., as thin as 10 nm) polymeric films on metal substrates, where the polymer is covalently bonded to the substrate. Furthermore, the polymeric film may be crosslinked at or near its exposed surface and/or throughout the bulk of the film via introduction of a crosslinking agent to the gas stream, and may be followed subsequently by annealing. The resulting film or coating exhibits significant reductions in thermal resistance, drop shedding size, and/or degradation rate during dropwise condensation of steam compared to existing coatings. Certain advantages of the described compositions and methods thereof are detailed as follows.

Variability of Film and Substrate Composition

In some embodiments, compositions and methods described herein may have a wide variability of film and substrate materials. Exemplary film materials include, but are not limited to fluoropolymers, including poly-tetrafluoroethylene (PTFE), poly-perfluoroacrylates, poly-perfluormethacrylates, and copolymers thereof. Other exemplary film materials include, but are not limited to, poly-methylmethacrylate (PMMA), poly-glycidyl methacrylate (PGMA), and poly-2-hydroxyethyl methacrylate. In certain embodiments, the polymeric film includes a fluoropolymer, e.g., PFDA, along with a crosslinker species, e.g., divinylbenzene (DVB). Some embodiments of the present invention utilize a fluorinated polymer, e.g. PTFE or PFDA, or combination thereof. For example, Teflon by DuPont, a PTFE, may be used. Some commercialized films of PTFE are available from GVD (http://www.gvdcorp.com/). Such films are described, for example, in U.S. Patent Application Publication No. 2013/0280442, U.S. Patent Application Publication No. 2013/0171546, and U.S. Patent Application Publication No. 2012/0003497, although these films as-described would not be suitable for dropwise condensation owing to high contact angle hysteresis and lack of crosslinking or other means of inducing steric hindrance.

In certain embodiments, the polymeric film includes exemplary eco-friendly C6-type fluoropolymer materials including, but not limited to 3,3,4,4,5,5,6,6,7,7,8,8,8-tridecafluorooctyl methacrylate, 1H,1H,2H,2H-perfluorooctyl acrylate, 2-(perfluorohexyl)ethyl methacrylate, [N-methylperfluorohexane-1-sulfonamide]ethyl acrylate, [N-methylperfluorohexane-1-sulfonamide]ethyl (meth)acrylate, 2-(Perfluoro-3-methylbutyl)ethyl methacrylate, 2-[[[[2-(perfluorohexyl)ethyl]sulfonyl]methyl]-amino]ethyl]acrylate, and copolymers thereof.

In addition, 2-(Perfluoro-3-methylbutyl)ethyl methacrylate (C5PFMA), combined with the crosslinking strategy or graded-structure strategy, can be explored via iCVD polymerization. This monomer has enriched $CF_3$ end groups, which lowers surface energy and promotes hydrophobicity.

In certain embodiments, the polymeric film comprises at least one member selected from the group consisting of polymethylmethacrylate (PMMA), polyglycidylmethacrylate (PGMA), poly-2-hydroxyethylmethacrylate, polyperfluoroacrylate (PFDA), and copolymers thereof. In certain embodiments, the polymeric film comprises a fluoropolymer. In certain embodiments, the fluoropolymer comprises polytetrafluoroethylene (PTFE). In certain embodiments, the fluoropolymer comprises $[C_{12}H_9F_{13}O_2]_n$, where n is an integer greater than zero (e.g., poly(3,3,4,4,5,5,6,6,7,7,8,8,8-tridecafluorooctyl methacrylate), or 'C6'-analog of PFDA). In certain embodiments, the fluoropolymer comprises a copolymer of divinylbenzene (DVB) and one or both of: PFDA and PTFE.

In one aspect, the invention is directed to an article for enhanced heat transfer, the article comprising a substrate and a (e.g., thin, uniform) polymeric film grafted (e.g., covalently bonded) thereupon. In certain embodiments, the substrate comprises a metal (e.g., steel, stainless steel, titanium, nickel, copper, and/or alloys thereof). In certain embodiments, the substrate comprises a semiconductor (e.g., SiC, Si, AlN, GaAs, GaN, ZnO, Ge, SiGe, BN, BAs, AlGaAs, $TiO_2$, etc.). In certain embodiments, the substrate comprises a rare earth element or compound comprising a rare earth element (e.g., a rare earth oxide, carbide, nitride, fluoride, or boride; e.g., cerium oxide $CeO_2$).

In some embodiments, methods are provided herein to graft this uniform polymeric film onto a wide variety of substrate materials. In certain embodiments, the film is a conformal film on a textured substrate. For example, in some embodiments, traditional materials such as stainless steel, titanium, nickel, copper, aluminum and/or their alloys may be coated by a thin conformal film of polymer to obtain a surface that exhibits robust dropwise condensation. According to some embodiments of the present invention, semiconductors such SiC, AlN, GaAs can be coated as well.

In some embodiments, the substrate on which the film is deposited includes plastic, silicon, quartz, woven or non-woven fabric, paper, ceramic, nylon, carbon, polyester, polyurethane, polyanhydride, polyorthoester, polyacrylonitrile, polyphenazine, polyisoprene, synthetic rubber, polytetrafluoroethylene, polyethylene terephthalate, acrylate polymer, chlorinated rubber, fluoropolymer, polyamide resin, vinyl resin, expanded polytetrafluoroethylene, low density polyethylene, high density polyethylene, or polypropylene. In some embodiments, the substrate is homogeneous. In some embodiments, the substrate is heterogeneous. In some embodiments, the substrate is planar. In some embodiments, the substrate is non-planar. In some embodiments, the substrate is concave. In some embodiments, the substrate is convex. In some embodiments, the substrate possesses a micro/nanoscale hierarchical texture.

Covalent Grafting

In some embodiments, compositions and methods described herein may have a covalently bonded interface between a film and a substrate. The film-substrate interfaces obtained by other methods of deposition, such as sputtering or casting, suffer from weak bonds between substrate and film. When stressed by the large mismatch in coefficient of thermal expansion ($\Delta\alpha \sim 1\times 10^{-4}$), hydrolysis in the presence of steam, or the shear stresses encountered during droplet coalescence, these interfaces have been shown to be highly prone to delamination. The covalently bonded interface used in accordance with some embodiments described herein may be shown to resist delamination for prolonged periods. The covalent bonding between the film and the substrate can also lower the thermal interface resistance, thereby improving the overall heat transfer coefficient.

Many different chemistries exist for covalently attaching a vinyl or other reactive group to a substrate, and specifically a metal substrate. Silanes, thiols, carboxylic acids, and phosphonates (or phosphonic acids) are examples of such well-known chemistries. Under some conditions, such as alkaline conditions with pH>7, the hydrolytic stability of phosphonates exceeds that of silanes. Under other conditions, such as under solar irradiation, silanes are more stable than phosphonates. Both phosphonates and silanes can possess one or more vinyl functional group. Silanes with more than one anchor point, referred to as dipodal silanes, result in greater stability and substrate adhesion.

Tunable Thickness & Morphology

Previous attempts at promoting dropwise condensation, for example with self-assembled monolayers, have usually resulted in films that degrade over time. Monolayers will inevitably have holes in the film that will act as degradation initiation sites. For example, the silane-metal bonds of a silanized substrate are susceptible to hydrolysis by steam. Other promoters, such as oleic acids, have been shown to function only on copper substrates, and are incompatible with the more industrially-relevant materials used in heat exchangers such as stainless steel and titanium alloys. A thicker film, e.g., more than a monolayer, will help ensure that there are no regions of exposed substrate.

However, since the thermal conductivity of polymers are much lower than that of a metal tube (for example, the thermal conductivity of bulk PTFE is approximately 0.25 W/mK as compared to approximately 20 W/mK for stainless steel), previous attempts at obtaining a dropwise promoter surface via polymer films were many microns thick. The additional thermal resistance posed by such thick films was enough to offset any benefits of the higher heat transfer coefficient during dropwise condensation, making these films unusable for promoting dropwise condensation.

To optimize the film thickness and to ensure that the conduction resistance of the polymer film contributes no more than 1% of the total resistance, the thickness, in some embodiments, must be less than 1 μm. The total thermal resistance includes the following resistances in series: the resistance from the condensing vapor to the substrate, the conduction resistance through the film and the substrate, and the convection resistance of the coolant:

$$R_T = Rs + R_f + R_m + R_w = (1/h_S) + (1/k)_f + (1/k)_m + (1/h)_w \qquad (1)$$

where the subscripts s, f, m, and w represent the steam condensation, film conduction, metal conduction, and water convection, respectively. Typical orders of magnitude of the variables are as follows: $h \approx 10^4$ $W \cdot m^{-2} \cdot K^{-1}$, $k_f \approx 10^{-1}$ $W \cdot m^{-1} \cdot K^{-1}$, $l_f \approx 10^{-3}$ m, $k_m \approx 10^2$ $W \cdot m^{-1} \cdot K^{-1}$, $h_w \approx 10^3$ $W \cdot m^{-2} \cdot K^{-1}$. Thus, the total resistance of the condenser is on the order of $10^{-3}$ $K \cdot m \cdot W^{-1}$, whereas the conduction resistance due to the film is on the order of $10^{-8}$ $K \cdot m \cdot W^{-1}$. Since the present coating is so thin (e.g., on the order of 10 nm, 20 nm, 30 nm, 40 nm), it represents only about 0.5% of the condensation resistance and ~0.001% of the total thermal resistance. This is in contrast to the polymer films in conventional systems that were typically many microns thick.

In some embodiments, a film described herein can be sufficiently thick enough to provide complete coverage, but thin enough to minimize any added thermal resistance. The thickness of a film may be precisely controlled in real time, for example, by laser interferometry (or other suitable methods) to obtain films as thin as 10 nm. The thermal resistance of a 10 nm film of PTFE is negligible: $4 \times 10^{-8}$ K/W, corresponding to a thermal conductance of 25 MW/m²K.

In certain embodiments, the deposited polymeric film has an average thickness from 1 nm to 1 micron. In certain embodiments, the deposited polymeric film has an average thickness from 1 nm to 100 nm.

In certain embodiments, the polymeric film is no greater than 500 nm in thickness (e.g., no greater than 400 nm, no greater than 300 nm, no greater than 200 nm, no greater than 100 nm, no greater than 75 nm, no greater than 50 nm, no greater than 25 nm, or no greater than 15 nm, e.g., as thin as 10 nm). In certain embodiments, the polymeric film has a thickness variation of no greater than about 20% (e.g., no greater than about 15%, no greater than about 10%, or no greater than about 5%—e.g., the polymer film is uniform). In some embodiments, the thickness of the polymeric film is about 10 nm, about 20 nm, about 30 nm, about 40 nm, about 50 nm, about 60 nm, about 70 nm, about 80 nm, about 90 nm, about 100 nm, about 125 nm, about 150 nm, about 175 nm, about 200 nm, about 225 nm, about 250 nm, about 275 nm, about 300 nm, about 325 nm, about 350 nm, about 375 nm, about 400 nm, about 425 nm, about 450 nm, about 475 nm, about 500 nm, about 525 nm, about 550 nm, about 575 nm, about 600 nm, about 625 nm, about 650 nm, about 675 nm, about 700 nm, about 725 nm, about 750 nm, about 775 nm, about 800 nm, about 825 nm, about 850 nm, about 875 nm, about 900 nm, about 1000 nm, about 1100 nm, about 1200 nm, about 1300 nm, about 1400 nm, or about 1500 nm.

Minimizing Contact Angle Hysteresis

In certain embodiments, a film is particularly useful for enhancing dropwise condensation. The dropwise heat transfer coefficient is strongly influenced by the size of the departing drops. Since a condensate drop begins to present a thermal resistance as soon as it forms, it would be desirable to shed condensate drops as soon as possible. A typical surface will be able to support a drop as it grows to the capillary length, which is approximately 2.7 millimeters for water. At this size, the drops present a significant thermal barrier. If instead the drops can be shed at a much smaller size, the overall heat transfer coefficient will be increased significantly. External forces such as gravity or vapor shear may be utilized to remove condensate droplets, but they will have to overcome the forces due to surface tension that pin the contact line of the drop to the condensing surface. A useful measure of the pinning strength of a surface is the contact angle hysteresis (CAH)—the difference between the advancing and receding contact angles. A lower CAH will result in easier shedding of condensate drops. For smooth surfaces, CAH is minimized when the surface is free of morphological and chemical inhomogeneities. Thus, a smooth, chemically homogeneous surface is desirable for minimizing CAH and maximizing the heat transfer coefficient.

Additionally, the molecular rearrangement of pendant moieties upon exposure to a wetting fluid such as water gives rise to increased CAH, as explained, for example, in A. Synytska, D. Appelhans, Z. G. Wang, F. Simon, F. Lehmann, M. Stamm, K. Grundke, *Macromolecules* 2007, 40, 1774. This rearrangement may be prevented by increasing the molecular rigidity via adjusting the degree of crystallinity and/or the degree of crosslinking to minimize the contact angle hysteresis. In some embodiments, compositions and methods described herein may have a tunable molecular rigidity. By altering the deposition parameters, the molecular rigidity may be adjusted at any position (e.g., at any depth or location) within the film, including the film-substrate interface and throughout bulk of the film. At the free surface of the film that is exposed to liquids, it is particularly desirable to obtain rigid films.

In some embodiments, a film is treated (e.g., annealed) after deposition. Without being bound to any particular theory, annealing can reduce hysteresis, by increasing the degree of crystallinity and/or increasing the degree of crosslinking of the film as explained, for example, in J. L. Yagüe, K. K. Gleason, *Macromolecules*, 2013, 46, 6548.

For example, a film described according to some embodiments discussed herein may be thermally annealed to improve both durability and contact angle hysteresis (CAH). In experiments described in more detail herein below, copolymer films of poly-perfluorodecyl acrylate and divinylbenzene (PFDA/DVB) were annealed at 60° C. to improve crosslinking, resulting in a surface with lower CAH and improved durability in the presence of high-temperature steam.

Figure 23:
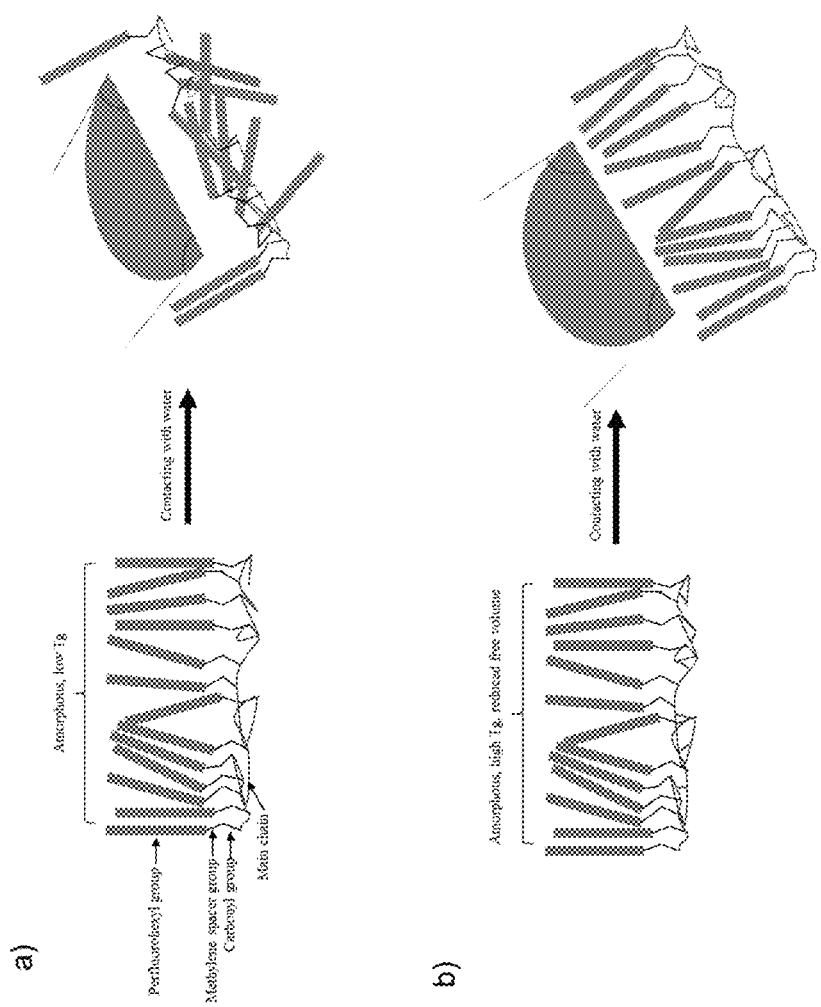
FIG. 23 shows the reorientation, or lack thereof, of pendant perfluorinated pendant groups upon exposure with water.

The smaller, eco-friendly $C_6$-type perfluorinated chains are more difficult to restrain from reorientation upon contact with water, but by carefully choosing an appropriate spacer group (located between the acrylate backbone and the fluorinated functional group), this reorientation may be mitigated. For example, a spacer consisting only of an ethyl group, such as (1H1H2H2H$C_{n+2}F_{2n+1}$)acrylate, crystallization at room temperature is possible only for n≥8, (for example such as (1H1H2H2H perfluorodecyl)acrylate with n=8), since interactions between adjacent monomers only occur only between their perfluorinated pendant groups. However, by substituting a [[sulfonyl]methyl]-amino] spacer for the ethyl spacer as an example, additional dipole-dipole interactions between the spacer groups of adjacent monomers are able to further restrain pendant groups and promote crystallization of smaller perfluorinated chains. Referring now to FIG. 23, we find that films of [N-methyl-perfluorohexane-1-sulfonamide]ethyl (meth)acrylate (C6PFSMA) exhibit significantly smaller contact angle hysteresis compared to films of [N-methyl-perfluorohexane-1-sulfonamide]ethyl acrylate (C6PFSA) and Poly(2-(Perfluorohexyl)ethyl methacrylate) (pC6PFMA).

A polymeric film may be crosslinked to improve rigidity and minimize CAH. Exemplary crosslinkers include, but are not limited to, divinylbenzene (DVB), ethylene dimethyacrylate (EDMA), di(ethyleneglycol)di(methacrylate), di(ethyleneglycol)di(acrylate), ethyleneglycoldimethacrylate (EGDMA) and di(ethyleneglycol)di(vinyl ether) (DEGDVE), and/or 1H,1H, 6H, 6H-perfluorohexyldiacrylate.

The contact angle hysteresis of iCVD films with various liquids is given in Table 1 below. The contact angle hysteresis may be measured with a goniometer by injecting liquid into a drop to measure the advancing contact angle, and withdrawing liquid from the drop to measure the receding contact angle.

TABLE 1

Contact angle hysteresis of iCVD films described herein with various liquids

| iCVD film | Liquid | Δθ [°] |
|---|---|---|
| PFDA homopolymer | Water | 5 |
| PFDA homopolymer | Mineral oil | 22 |
| PFDA-co-DVB copolymer | Hexane | 11 |
| PFDA-co-DVB copolymer | Pentane | 8 |

In certain embodiments, the polymeric film has a surface (e.g., exposed surface) with low contact angle hysteresis (e.g., no greater than 50°, no greater than 40°, no greater than 30°, no greater than 25°, no greater than 20°, no greater than 15°, or no greater than 10° for water, where contact angle hysteresis is the difference between advancing contact angle and receding contact angle). In certain embodiments, the polymeric film has a surface (e.g., exposed surface) with high advancing contact angle (e.g., no less than 70°, no less than 80°, no less than 90°, no less than 100°, no less than 120°, no less than 130° for water) and/or high receding contact angle (e.g., no less than 60°, no less than 70°, no less than 80°, no less than 90°, no less than 100°, no less than 110°, or no less than 120° for water). In some embodiments, the advancing water contact angle is greater than about 150°. In some embodiments, the advancing water contact angle is about 150°, about 155°, about 160°, about 165°, or about 170°. In some embodiments, the receding water contact angle is greater than about 150°. In some embodiments, the receding water contact angle is about 150°, about 155°, about 160°, about 165°, or about 170°.

Preferably, the contact angle hysteresis is <25°. More preferably, the contact angle hysteresis is <5°. If the contact angle hysteresis is higher, it may be compensated for by a lower surface energy, which would result in a larger contact angle and a larger gravitational body force per length of contact line acting to shed the drop.

In some embodiments, the water contact angle hysteresis is about 10°, about 9°, about 8°, about 7°, about 6°, about 5°, about 4°, or about 3°. In some embodiments, the water contact angle hysteresis is between about 3° and about 10°.

In some embodiments, the advancing mineral oil contact angle is greater than about 100°. In some embodiments, the advancing mineral oil contact angle is about 100°, about 105°, about 110°, about 115°, about 120°, about 125°, or about 130°. In some embodiments, the advancing mineral oil contact angle is between about 100° and about 130°.

In some embodiments, the receding mineral oil contact angle is greater than about 100°. In some embodiments, the receding mineral oil contact angle is about 100°, about 105°, about 110°, about 115°, about 120°, about 125°, or about 130°. In some embodiments, the receding mineral oil contact angle is between about 100° and about 130°.

In some embodiments, the static mineral oil contact angle is greater than about 100°. In some embodiments, the static mineral oil contact angle is about 100°, about 105°, about 110°, or about 115°. In some embodiments, the static mineral oil contact angle is between about 100° and about 115°.

iCVD Coating Process

Coating typically involves the deposition of films or layers on a surface of a substrate. One manner of effecting the deposition of such films or layers is through chemical vapor deposition (CVD). CVD involves a chemical reaction of vapor phase chemicals or reactants that contain the constituents to be deposited on the substrate. Reactant gases are introduced into a reaction chamber or reactor, and are decomposed and reacted at a heated surface to form the desired film or layer.

In some embodiments, CVD used in accordance with the present invention is an initiated CVD (iCVD). iCVD Deposition Example in Cylindrical Reactor below discusses a typical experimental set-up for iCVD. In an iCVD process, thin filament wires are heated, thus supplying the energy to fragment a thermally-labile initiator, thereby forming a radical at moderate temperatures. The use of an initiator not only allows the chemistry to be controlled, but also accelerates film growth and provides control of molecular weight and rate. The energy input is low due to the low filament temperatures, but high growth rates may be achieved. The process progresses independent of the shape or composition of the substrate, is easily scalable, and easily integrated with other processes.

In certain embodiments, iCVD takes place in a reactor. In certain embodiments, a variety of monomer species may be polymerized and deposited by iCVD. In certain embodiments, the surface to be coated is placed on a stage in the reactor and gaseous precursor molecules are fed into the reactor; the stage may be the bottom of the reactor and not a separate entity. In certain embodiments, a variety of carrier gases are useful in iCVD.

In certain embodiments, the iCVD reactor has automated electronics to control reactor pressure and to control reactant flow rates. In certain embodiments, unreacted vapors may be exhausted from the system.

The iCVD process is a single-step, solvent-free, low-energy, vapor-phase method used to deposit conformal films with precisely controllable thickness and in which grafting to the substrate provides enhanced durability, as discussed, for example, in M. E. Alf, A. Asatekin, M. C. Barr, S. H. Baxamusa, H. Chelawat, G. Ozaydin-Ince, C. D. Petruczok, R. Sreenivasan, W. E. Tenhaeff, N. J. Trujillo, S. Vaddiraju, J. Xu, K. K. Gleason, Adv. Mater. 2010, 22, 1993. The large choice of suitable monomers that may be used allows for precise design and modulation of surface properties.

Certain embodiments presented herein relate to films exhibiting a combination of durability and low contact angle hysteresis. Copolymerization with a crosslinker is an additional method that aids in both further reduction of contact angle hysteresis and also rendering the films more stable to chemical and mechanical degradation—making the films more robust and extending the useful life of those films.

Certain embodiments presented herein relate to the use of vapor synthesis for copolymerization, which in some embodiments does not require that the two monomers being copolymerized have a common solvent. This characteristic will be recognized by those skilled in the art as a significant advantage over wet-chemistry synthesis techniques, as a common solvent does not exist for PFDA and DVB. In some embodiments, iCVD allows a non-fluorinated crosslinker, DVB, to be readily copolymerized with the fluorinated monomer, PFDA, over its entire compositional range.

Copolymerization also disrupts crystallization. Since crystallites are one source of roughness, copolymer films in some embodiments may be made to be smoother than crystalline iCVD p(PFDA) homopolymer layers. Such smooth surfaces may be desired to reduce the contact angle hysteresis of low-surface tension fluids such as hydrocarbons, refrigerants, and/or cryogens. Additionally, the perfluorinated side chains of the PFDA units segregate to the interface under dry conditions in order to minimize surface energy. Surface reconstruction in which the perfluoro chains orient away from the interface can occur when the surface becomes wet.

The iCVD of homopolymers p(PFDA) and p(DVB) results in highly conformal thin films, and superhydrophobic and superoleophobic surfaces have been demonstrated with iCVD films of p(PFDA).

Figure 18:
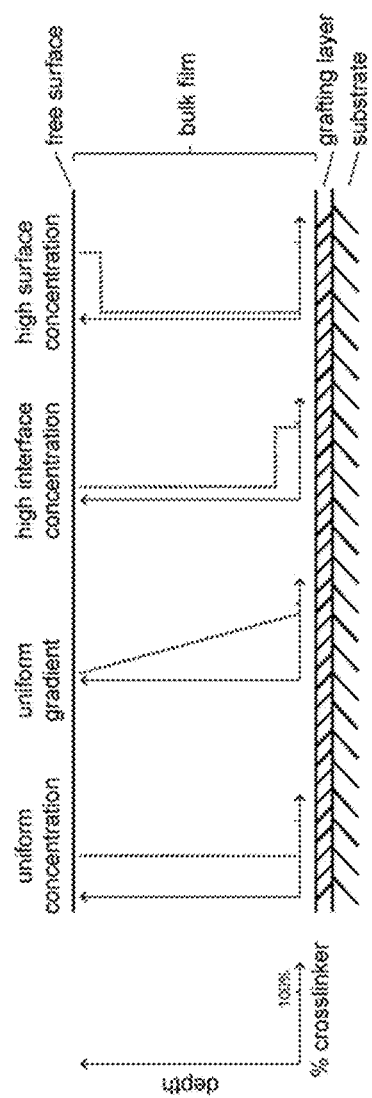
FIG. 18 schematically illustrates embodiments employing variation in degree of crosslinking and/or variation in concentration of crosslinking agent as a function of position of the crosslinking agent along the thickness of the polymeric film, in accordance with some embodiments presented herein.

Certain embodiments described herein prevent the reorientation of $CF_3$ groups via crosslinking A crosslinking agent provides a controllable means of steric hindrance, because the proportion (e.g., concentration in particular location) of crosslinking agent may be varied along the film thickness. FIG. 18 schematically illustrates embodiments employing variation in degree of crosslinking and/or variation in concentration of crosslinking agent as a function of position of the crosslinking agent along the thickness of the polymeric film. The polymeric film includes a grafting layer (e.g., where the grafting layer has a thickness from about 0.5 nm to about 5 nm, or from about 1 nm to about 3 nm, or from about 1 nm to about 2 nm), and a bulk film layer making up the majority (e.g., more than 50%, more than 55%, more than 60%, more than 70%, more than 80%, more than 90%, more than 95%) of the polymeric film. In certain embodiments, the polymeric film has at thickness no greater than 400 nm, no greater than 300 nm, no greater than 200 nm, no greater than 100 nm, no greater than 75 nm, no greater than 50 nm, no greater than 25 nm, or no greater than 15 nm, in thickness. In some embodiments, the polymeric film may be as thin as 10 nm or have a thickness on the order of 10 nm.

One of the main difficulties in obtaining a surface that exhibits dropwise condensation of hydrocarbons and other low-surface tension liquids has been obtaining a surface with a sufficiently low critical surface tension. The condensate will spread to form a film unless the critical surface tension of the surface is below that of the condensing liquid. Table 2 below lists the surface tension values for water and a variety of other liquids, including n-alkanes (octane, hexane, pentane) and a fluorocarbon similar to a typical refrigerant. Table 3 lists refrigerants, e.g., hydrofluorocarbons, chlorofluorocarbons, and hydrochlorofluorocarbons.

The n-alkanes have surface tensions that are considerably lower than water, and also lower than most common industrial materials (including polymers) whose critical surface tensions are shown in Table 4. For example, Teflon has a surface energy of 19 mN/m, since it is composed principally of $CF_2$ groups, and is not sufficient to condense hexane or lower alkanes. Even trichloro(1H,1H,2H,2H-perfluorooctyl) silane (commonly referred to as fluorosilane, a low-surface energy fluorinated silane surface modifier), has a critical surface energy of 10 mN/m. Although fluorosilane is terminated by $CF_3$ groups, the lack of crosslinking or other steric hindrance allows these $CF_3$ group to reorient in the presence of water or another wetting liquid. As a result, it is difficult to obtain a surface with a critical surface energy low enough to promote dropwise condensation of these liquids.

TABLE 2

Surface tensions of water and various low-surface tension fluids.

| liquid | $\sigma_{lv}$ @25° C. [mN/m] |
|---|---|
| water | 72.71 |
| toluene | 27.93 |
| isopropanol | 20.92 |
| ethanol | 24.77 |
| octane | 21.08 |
| hexane | 17.98 |
| pentane | 15.47 |
| perfluorohexane | 11.47 |

TABLE 3

List of refrigerants.

Chlorofluorocarbons

| R-11 | Trichlorofluoromethane |
| R-12 | Dichlorodifluoromethane |
| R-13 | Chlorotrifluoromethane |
| R-13B1 | Bromotrifluoromethane |
| R-14 | Tetrafluoromethane |
| R-113 | Trichlorotrifluoroethane |
| R-114 | 1,2-Dichloro-1,1,2,2-Tetrafluoroethane |
| R-500 | Dichlorodifluoromethane, Difluoroethane |
| R-502 | Chlorodifluoromethane, Chloropentafluoroethane |
| R-503 | Chlorotrifluoromethane, Trifluoromethane |

Hydrochlorofluorocarbons

| R-12 | 1-Chloro-1,2,2,2-tetrafluoroethane, 1,1,1,2-Tetrafluoroethane |
| R-22 | Chlorodifluoromethane |
| R-123 | Dichlorotrifluoroethane |
| R-124 | 1-Chloro-1,2,2,2-Tetrafluoroethane |
| R-401A | Chlorodifluoromethane, Chlorotetrafluoroethane |
| R-401B | Chlorodifluoromethane, Chlorotetrafluoroethane |
| R-402A | Chlorodifluoromethane, Pentafluoroethane |
| R-402B | Chlorodifluoromethane, Pentafluoroethane |
| R-408A | Trifluoroethane, Chlorodifluoromethane |
| R-409A | Chlorodifluoromethane, Chlorotetrafluoroethane |
| R-412A | Chlorodifluoromethane, 1-Chloro-1,1-Difluoroethane and Octafluoropropane |
| R-414B | Chlorodifluoromethane, Chlorodifluoromethane, Chlorotetrafluoroethane |
| R-416A | 1-Chloro-1,2,2,2-tetrafluoroethane, 1,1,1,2-Tetrafluoroethane |

Hydrofluorocarbons

| R-23 | Trifluoromethane |
| R-116 | Hexafluoroethane |
| R-134a | 1,1,1,2-Tetrafluoroethane |
| R-404A | Pentafluoroethane, 1,1,1,2-Tetrafluoroethane, Trifluoroethane |
| R-407A | Difluoromethane, Pentafluoroethane, 1,1,1,2-Tetrafluoroethane |
| R-407B | Difluoromethane, Pentafluoroethane, 1,1,1,2-Tetrafluoroethane |
| R-407C | Difluoromethane, Pentafluoroethane, 1,1,1,2-Tetrafluoroethane |
| R-410A | Pentafluoroethane, Difluoromethane |
| R-417A | 1,1,1,2-Tetrafluoroethane and Pentafluoroethane |
| R-422A | 1,1,1,2-Tetrafluoroethane and Pentafluoroethane |
| R-422D | 1,1,1,2-Tetrafluoroethane and Pentafluoroethane |
| R-423A | Tetrafluoroethane, Heptafluoropropane |
| R-427A | 1,1,1,2-Tetrafluoroethane, Pentafluoroethane |
| R-438A | Difluoromethane, Pentafluoroethane, 1,1,1,2-Tetrafluoroethane, n-Butane, Isopentane |
| R-507 | Pentafluoroethane, Trifluoroethane |
| R-508A | Trifluoromethane, Hexafluoroethane |
| R-508B | Trifluoromethane, Hexafluoroethane |

TABLE 4

Critical surface energy of industrial polymers.

| Polymer Abbr. | Polymer Name | Surface Energy (dynes/cm) | Contact Angles (degrees) |
|---|---|---|---|
| PES | Polyethersulfone | 46 | 90 |
| | Styrene butadiene rubber | 48 | |
| PPO | Polyphenylene oxide | 47 | 75 |
| | Nylon 6/6 (polyhexamethylene adipamide) | 46 | |
| PC | Polycarbonate | 46 | 75 |
| | Nylon-6 (polycaprolactam) | 38 | |
| PET | Polyethylene terephthalate | 42 | 76 |
| PMMA | Polymethylmethacrylate | 41 | 82 |
| SAN | Styrene acrylonitrile | 40 | 74 |
| | Polyimide | 40 | 83 |
| PCV r | Polyvinyl chloride, rigid | 39 | 90 |
| | Polyester | 41 | 70 |
| | Acetal | 36 | 85 |
| ABS | Acrylonitrile butadiene styrene | 35 | 82 |
| PPS | Polyphenylene sulfide | 38 | 87 |
| PVA | Polyvinyl alcohol | 37 | 10 |
| | Polyacrylate (acrylic film) | 35 | |
| PVC p | Polyvinyl chloride, plasticized | 35 | 89 |
| PS | Polystyrene | 34 | 72 |
| | Nylon-12 | 36 | |
| | Surlyn ionomer | 33 | 80 |
| PBT | Polybutylene terephthalate | 32 | 88 |
| CTFE | Polychlorotrifluoroethylene | 31 | |
| PP | Polypropylene | 30 | 88 |
| PU | Polyurethane | 38 | 85 |
| PE | Polyethylene | 30 | 88 |
| PVF | Polyvinyl fluoride | 28 | |
| PVDF | Polyvinylidene fluoride | 25 | 80 |
| | Natural rubber | 24 | |
| PDMS | Polydimethyl sioloxane (silicone elastomer) | 23 | 98 |
| FEP | Fluorinated ethylene propylene | 20 | 98 |
| PTFE | Polytetrafluoroethylene | 19 | 120 |

Figure 19:
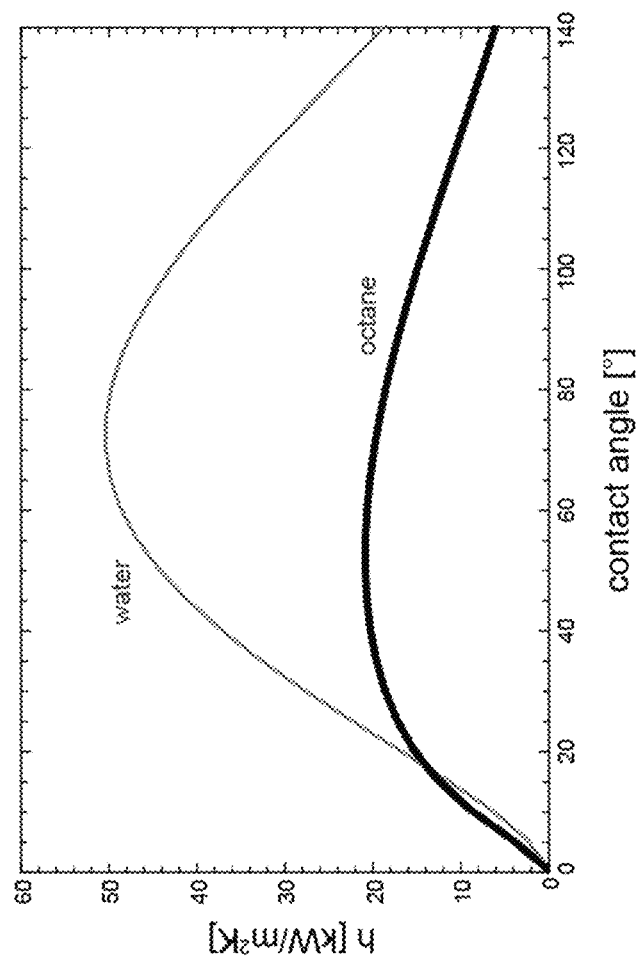
FIG. 19 is a plot showing the effect of contact angle θ on heat transfer coefficient h, where maximum h is at θ~90° (hexane66.5/54.6°), in accordance with some embodiments presented herein.

Even if a surface can be found with sufficiently low surface energy to avoid spreading of the condensate, a second difficulty in obtaining dropwise condensation of low surface tension liquids is reducing the contact angle hysteresis (and thus the drop adhesion). If the adhesion of the condensate drops to the surface is high, then the drops will be unable to shed from the surface, and the initial dropwise condensation will proceed until the individual drops merge to form a continuous film. This is an especially difficult problem in the case of low-surface tension fluids. Since the contact angle of a condensate drop will inevitably be low (in the range of about 10° to 30°), the ratio of the body force due to gravity acting to shed the drop will be small compared to the force acting to pin the drop to the surface. A plot showing the effect of contact angle θ on heat transfer coefficient h is shown in FIG. 19, where maximum h for water is at 0~90° and for octane ~50°.

Figure 22:
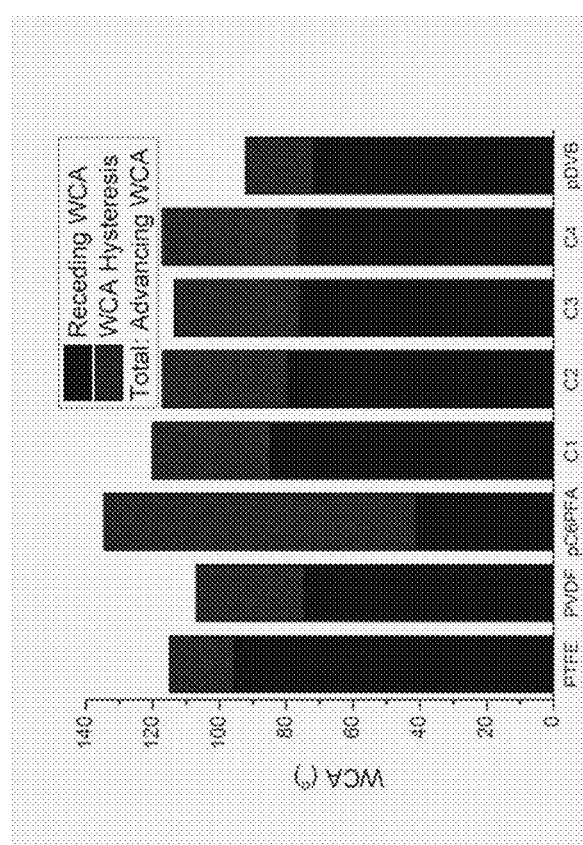
FIG. 22 is a plot showing the water contact angles on PTFE, PVDF, and diverse compositional ranges from pC6PFA homopolymer to pDVB homopolymer.

Surfaces that promote dropwise shedding of low-surface tension condensates, such as liquid hydrocarbons, are demonstrated in the experimental examples presented herein. For example, demonstrated herein is the dropwise condensation of hexane on a surface comprising iCVD copolymer of PFDA-co-DVB. FIGS. 22A and 22B are photographic stills from a video showing dropwise condensation and shedding of n-hexane on a PFDA-co-DVB on silicon substrate, where P=15 kPa, $T_s$=10±1° C., $T_{sat}$=18.3° C., and ΔT=8.3±1° C.

Figure 20B:
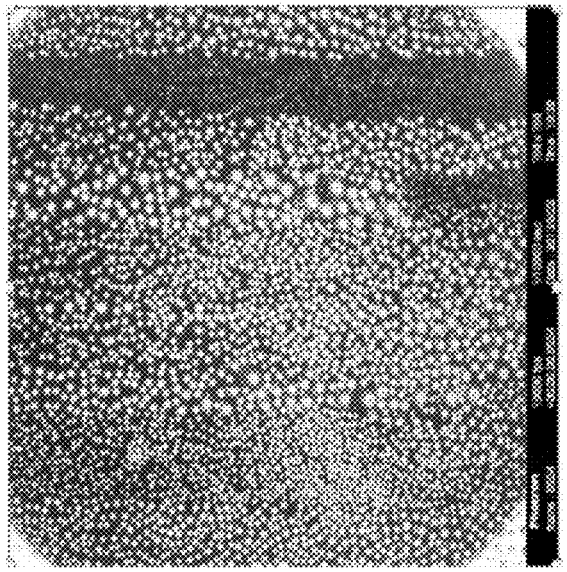
FIGS. 20a and 20b are photographic stills from a video showing dropwise condensation and shedding of n-hexane on a PFDA-co-DVB on silicon substrate, where P=15 kPa, $T_s$=10±1° C., $T_{sat}$=18.3° C., and ΔT=8.3±1° C., in accordance with some embodiments presented herein.
Figure 20A:
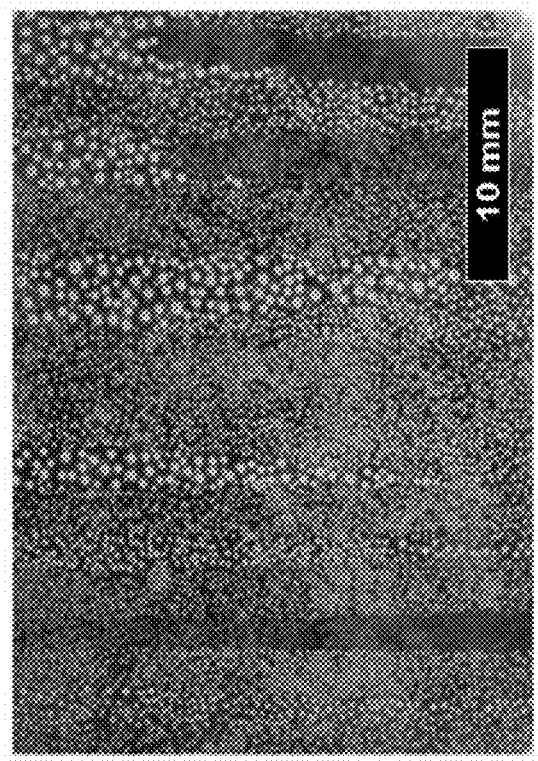

Surfaces such as the ones shown in FIGS. 20a and 20b have valuable applications in a wide variety of industries, for example, in applications of refrigeration, dehumidification, and HVAC, which condense a refrigerant, generally a low-surface tension fluorocarbon fluid. Condensers that promote dropwise shedding of such fluids result in higher overall efficiencies and/or lower device footprint. Further applications include power plants utilizing organic Rankine cycles, e.g., with isobutene, pentane, or propane as the working fluid, which may allow for smaller condensers to be used, and lower capital costs for such power plants. Other applications include the fractionation of hydrocarbon crude streams into constituent components, allowing for smaller fractionation columns with fewer stacks.

Also presented herein is the finding that surfaces with both (1) low critical surface energy and (2) low contact angle hysteresis promote dropwise shedding of low-surface tension condensates such as liquid hydrocarbons. Furthermore, owing to the grafting (e.g., covalent bonding) of the film to the substrate, these surfaces display a high degree of robustness. They are seen to survive prolonged condensation in 100° C. steam with no noticeable degradation.

For example, the critical surface energy of an iCVD-grafted PFDA homopolymer has been determined to be 5.6 mN/m, as compared to 18.5 mN/m for the ungrafted homopolymer. Critical surface energy may be determined by plotting $1-\cos(\theta_a)$, where $\theta_a$ is the cosine of the advancing contact angle of a homologous series of liquids, e.g. n-heptane, n-octane, n-decane, etc., and finding the x-intercept. In certain embodiments, the critical surface energy is <18 mN/m. If the critical surface energy is higher, the surface may become flooded by the low-surface tension fluid. In some embodiments, the critical surface energy is <6 mN/m.

There is a wide array of industrial applications for iCVD coatings for dropwise condensation and shedding of low-surface tension liquids. Condensation of low-surface tension liquids in industrial applications has occurred in the filmwise mode due to the aforementioned difficulties in achieving dropwise condensation and shedding. As a result, since the thermal conductivities of low-surface tension fluids (typically <0.2 W/mK) are worse even than water (0.6 W/mK), these condensers suffer from considerable thermal inefficiencies due to the thermal resistance of the condensate film. By implementing a dropwise condenser, e.g., with iCVD coating as described herein, the heat transfer coefficient [W/m²K] can increase tenfold. Thus, in certain embodiments, for a given coolant temperature, ten times the heat can be transferred, or the same amount of heat can be transferred by a heat exchanger that is smaller than the original size or by a temperature difference that is smaller than the original temperature difference.

The coatings/surfaces described herein have numerous important uses in oil and gas processing (e.g., LNG, propane, etc.); refrigerants, condenser coils in dehumidification systems, commercial/residential HVAC, consumer packaging, medical devices, water recovery from cooling towers, dew/fog collection, organic Rankine cycles, steam based power generation (e.g., solar thermal, geothermal, etc.), liquefaction (including LNG, $CO_2$, $N_2$, liquid oxygen, etc.), and phase transition applications involving mitigation of icing, hydrates, and scale formation.

In applications of refrigeration, dehumidification, and HVAC which condense a refrigerant (typically a low-surface tension fluorocarbon fluid), dropwise condensers would result in higher overall efficiencies and lower device footprint. In power applications utilizing organic Rankine cycles, e.g. with isobutene, pentane, or propane as the working fluid, condensers must be used to pull the working fluid through the turbine and condense back to liquid to be pumped back through the cycle. Implementing dropwise condensers would allow for smaller equipment size, which would significantly reduce the capital cost of such plants; and would also allow for better overall cycle efficiencies. In the fractionation of crude streams into constituent components, e.g. kerosene, alkanes, fuel oils, and diesel and heavier fuels, dropwise condensing surfaces would allow for smaller fractionation columns with fewer stacks. In applications such as the liquefaction of natural gas, oxygen, and nitrogen, cold boxes are used to condense a gas stream into a liquid. The cooling flux of the cold box is provided by a portion of the liquefied product, and so by increasing the heat transfer coefficient of the condensers, the liquefaction plant would be able to produce a larger amount of valuable liquid product instead of less-valuable gaseous product. Furthermore, with the advent of ship-based liquefaction plants, the heat transfer equipment becomes severely space-constrained. A dropwise condenser would provide the same heat flux in a much smaller footprint than the current filmwise condensers.

Industrial applications of the surfaces described herein include phase change applications, wherein the surfaces minimize adhesion of solid phases nucleating and growing on the surfaces, e.g., where there is ice formation on power lines, wind turbines, aircraft, and municipal pipelines; where there is hydrate formation on oil and gas equipment (e.g., undersea); and where there is scale formation on equipment in power plants and boilers, in desalination plants, and municipal pipelines. The low hysteresis of the coatings/surfaces described herein can be exploited for shedding (e.g., dropwise shedding) of unwanted liquid drops, as in water from car windshields, solar panels, and industrial machinery; oil contaminants from household cookware, consumer electronics, and industrial machinery; and blood and other biological fluids from medical devices. The low surface energy of the coating/surfaces described herein can also be exploited for their low solid-solid frictional properties, e.g., sliding linear bearings, bushings, and non-stick household implements.

In certain embodiments, a film described herein is used in power plants, desalination condensers, humidification-dehumidification systems, or heating, ventilation, and air conditioning (HVAC). In certain embodiments, a film is used in a thermal interface material (TIM) because of its covalent bonding and flexibility. In certain embodiments, a film is used for cooling of electronics and photonics.

In certain embodiments, the surface energy of a thin film (e.g., a film of fluorinated polymer) is sufficiently low to be oleophobic, which would allow it to be used for dropwise condensation of hydrocarbons.

Some examples below discuss sustained dropwise condensation of steam on a thin film of poly-(1H,1H,2H,2H-perfluorodecyl acrylate)-co-divinyl benzene (p(PFDA-co-DVB).

It is found that roughness can be precisely specified and designed so that it is high enough to enhance nucleation density but low enough such that it does not adversely affect hysteresis. Roughness may be designed by numerous methods, including, for example, degree of crystallization, extent of crosslinking, composition of crosslinker, and substrate temperature during deposition.

Also described herein are findings regarding variables of the described coatings/surfaces, including surface energy, roughness, and substrate bonding.

Regarding surface energy, it is found that the surface energy of the surface/coating should be lower than the condensate liquid. For example, for the PFDA-co-DVB copolymer described herein, surface energy may be determined from a ratio of $CF_3$ groups to $CF_2$ groups at the surface, where $\sigma_{CF3}$=6 mN/m and a $\sigma_{CF2}$=18 mN/m. It is found that on a non-crosslinked surface (e.g., fluorosilane), $CF_3$ groups re-orient away from the surface when exposed to water. It is also found that DVB crosslinking rigidifies the $CF_3$ groups of the PFDA and prevents reorientation. Furthermore, it is found that grafting forces orientation of $CF_3$ groups toward the surface.

Regarding roughness, it is found that roughness should be low enough to avoid contact angle hysteresis. For example, roughness features small than ~100 nm are "weak" defects and do not contribute to hysteresis. It is also found that some small amount of roughness is beneficial for providing nucleation sites. Moreover, roughness can be controlled by crosslinking. For example, PFDA homopolymer (non-crosslinked) crystallizes into large hemispherical agglomerations. Crosslinking prevents crystallization and lowers roughness. Copolymer films of p(PFDA-co-DVB) exhibit a much smaller degree of crystallinity than PFDA homopolymer, however still exhibit semicrystalline agglomerations that enhance the nucleation density.

Regarding substrate bonding, it is found that covalent bonds of the present coatings/surfaces are stronger than van der Waals bonds of typical Teflon coatings. Moreover, the vinyl group of PFDA is found to bond covalently with an initiated vinyl group on the surface.

EXPERIMENTAL EXAMPLES iCVD Deposition Experiment
A—p(PFDA-co-DVB)

Figure 10:
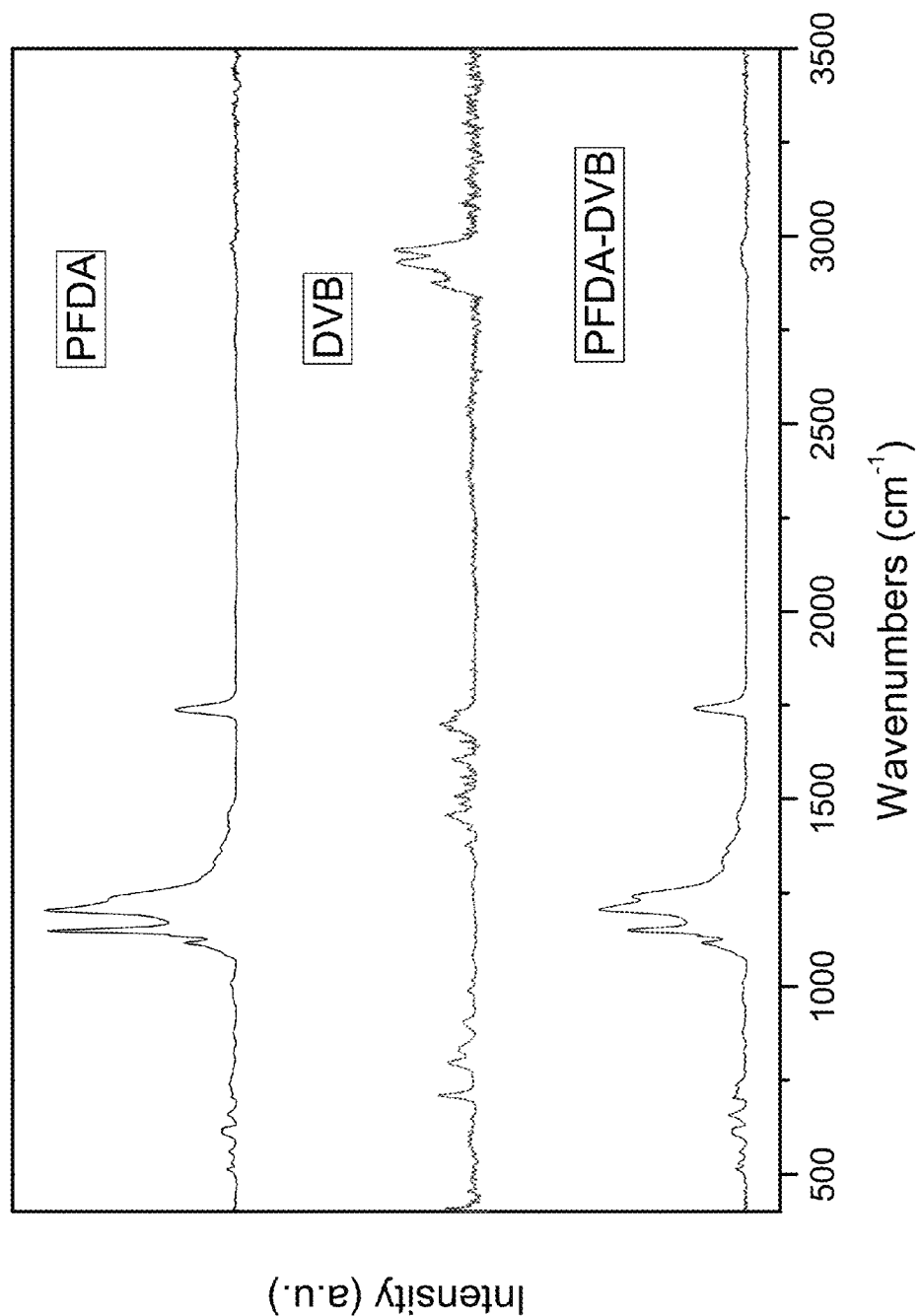
FIG. 10 is a graph of FT-IR of the pPFDA homopolymer, the pDVB homopolymer and a P(PFDA-co-DVB) copolymer in accordance with some embodiments presented herein.
Figure 12:
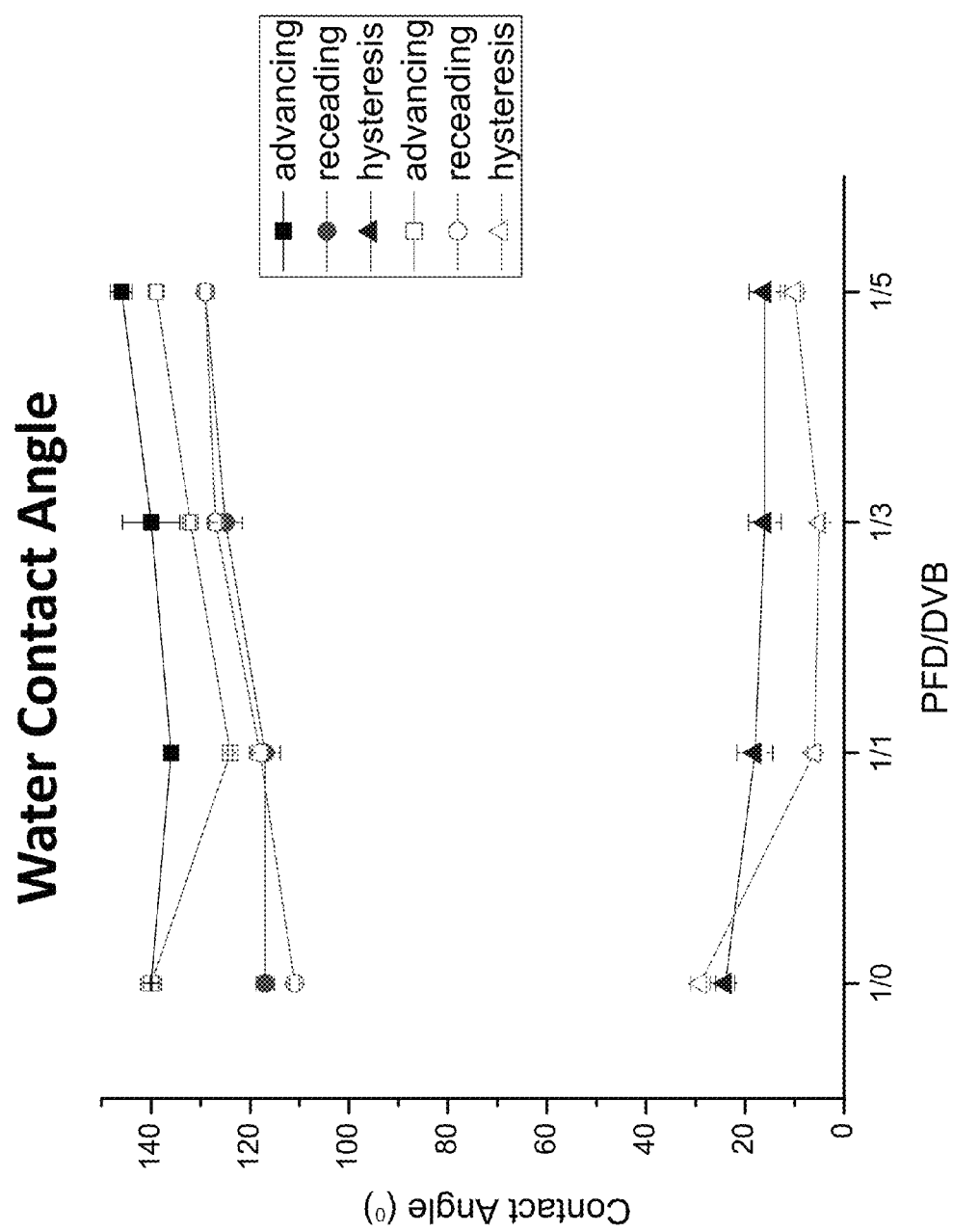
FIG. 12 is a water contact angle graph for pPFDA homopolymer and a series of p(PFDA-co-DVB) copolymers, for non-annealed (solid) and annealed samples (open) in accordance with some embodiments presented herein.
Figure 13:
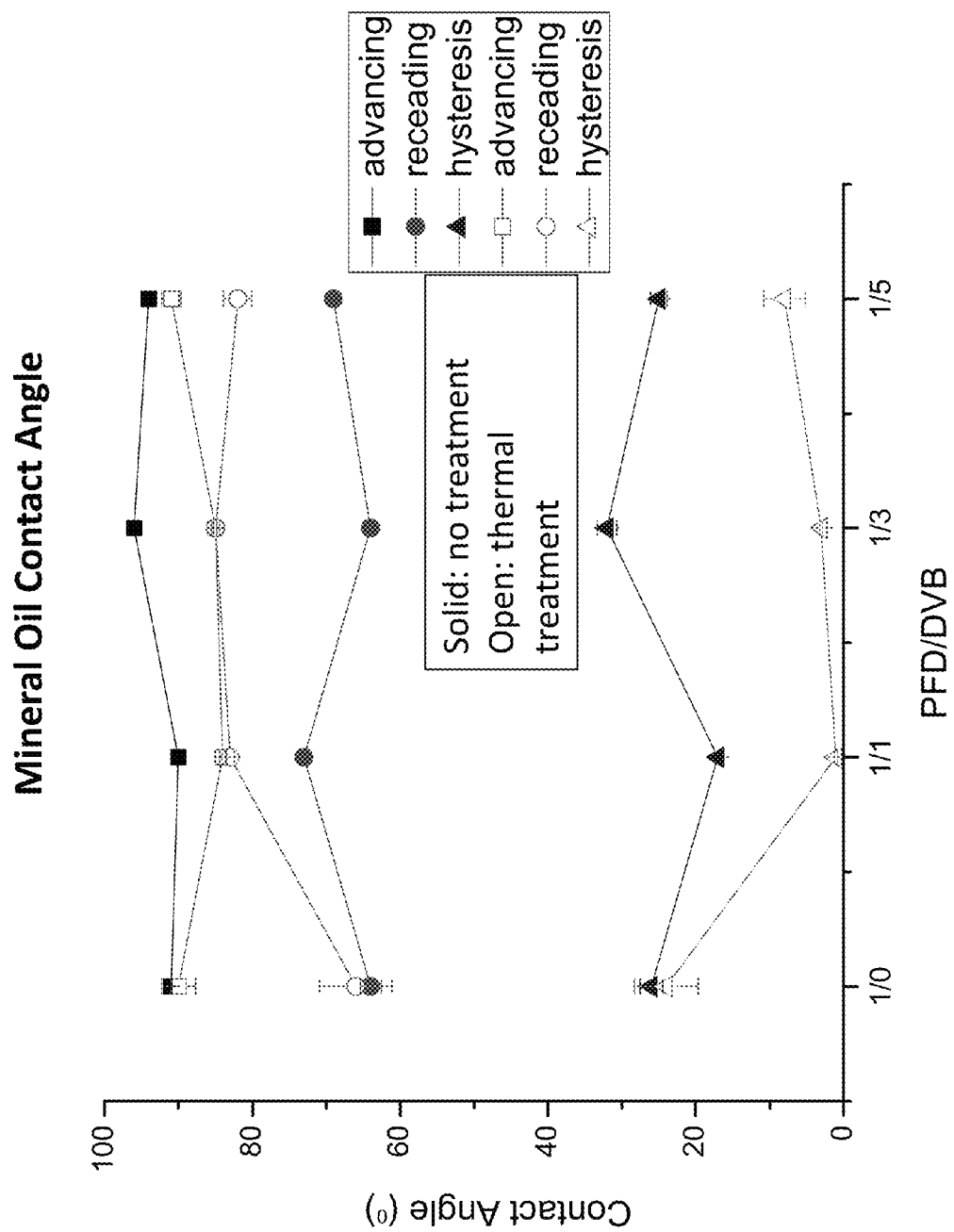
FIG. 13 is a mineral oil contact angle graph for pPFDA homopolymer and a series of p(PFDA-co-DVB) copolymers, for non-annealed (solid) and annealed samples (open) in accordance with some embodiments presented herein.
Figure 14:
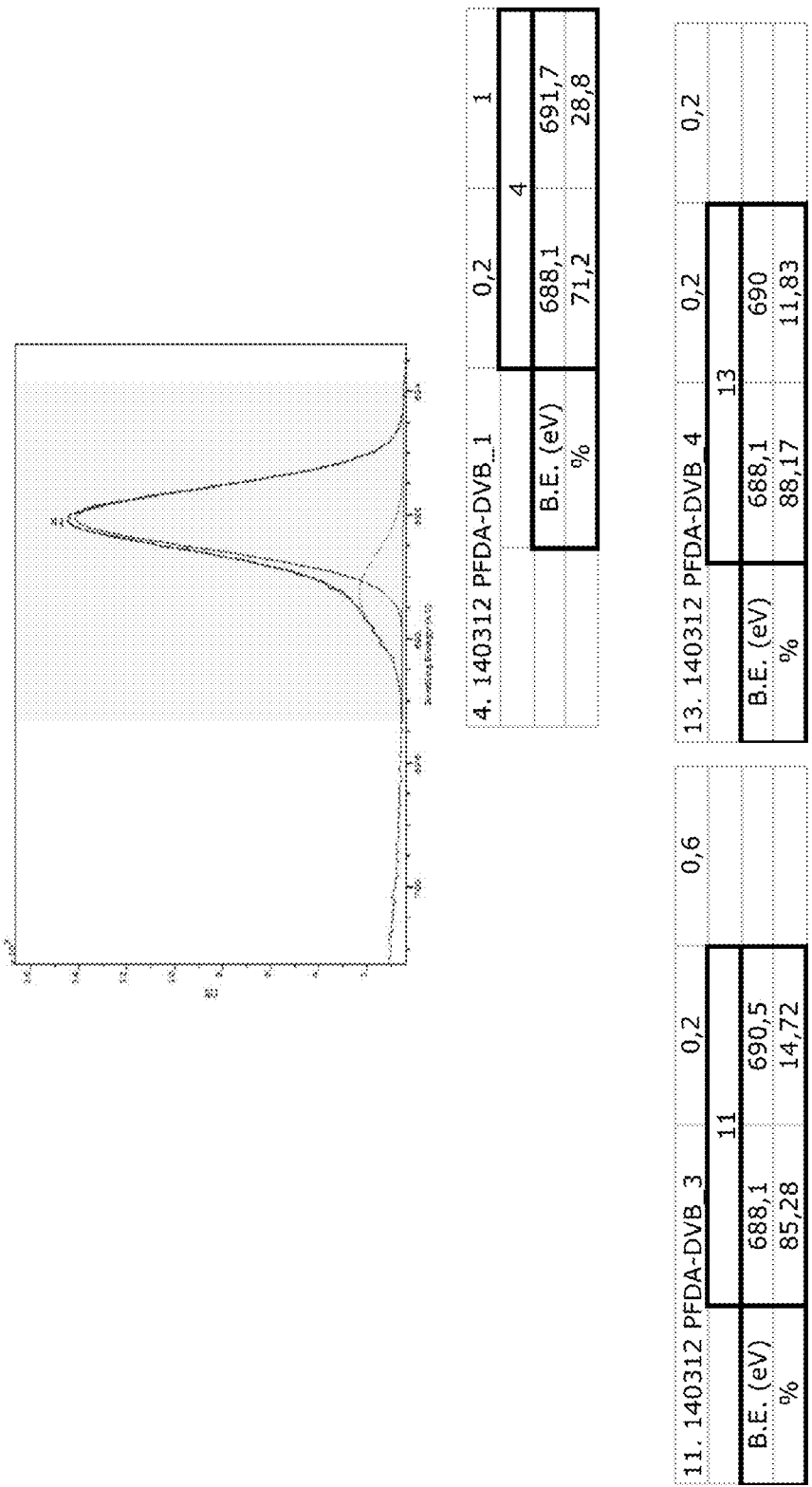
FIG. 14 illustrates XPS analysis of different p(PFDA-co-DVB) copolymers in accordance with some embodiments presented herein.
Figure 15:
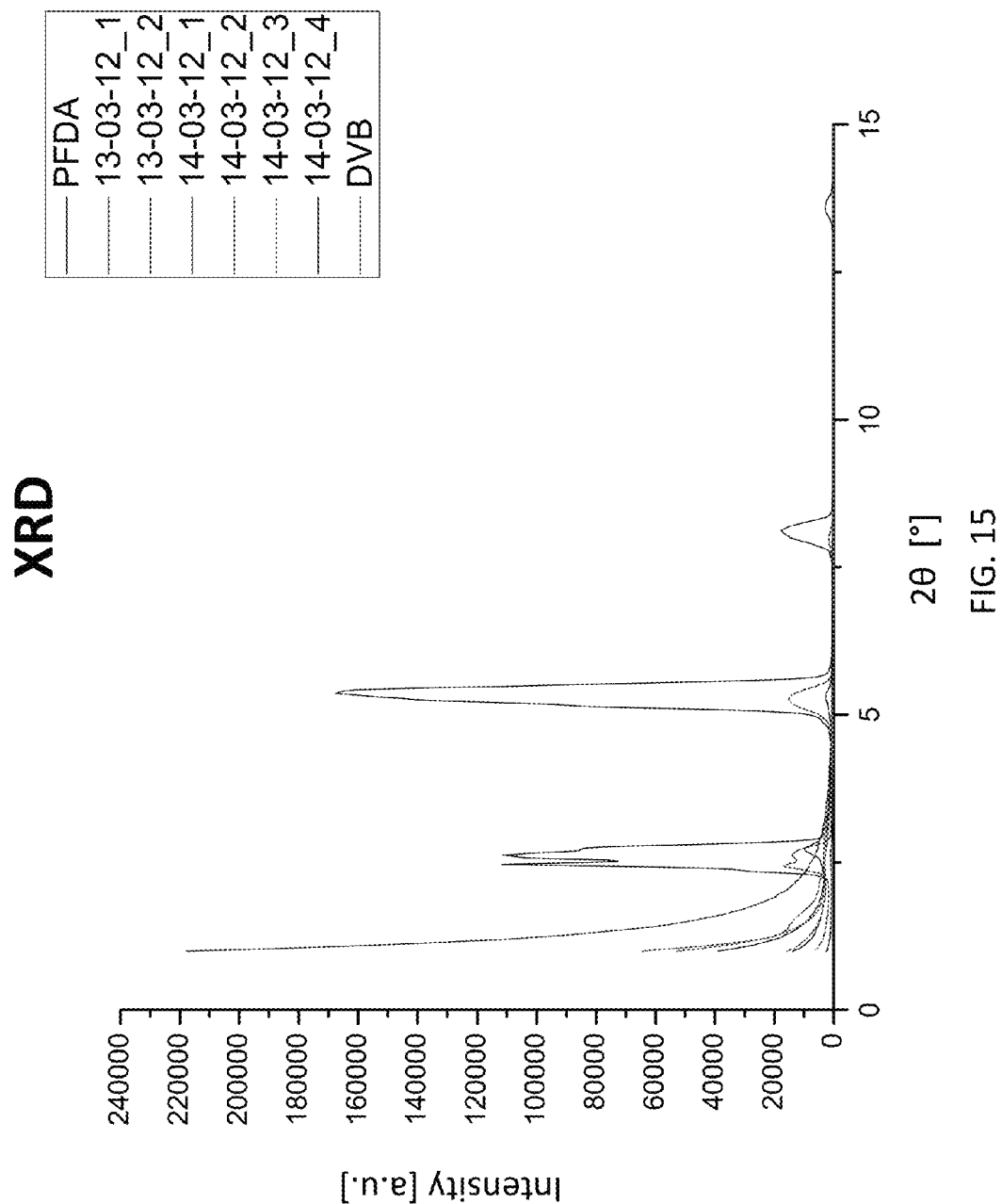
FIG. 15 illustrates XRD analysis of the pPFDA homopolymer, the pDVB homopolymer and diverse P(PFDA-co-DVB) copolymer in accordance with some embodiments presented herein.
Figure 16:
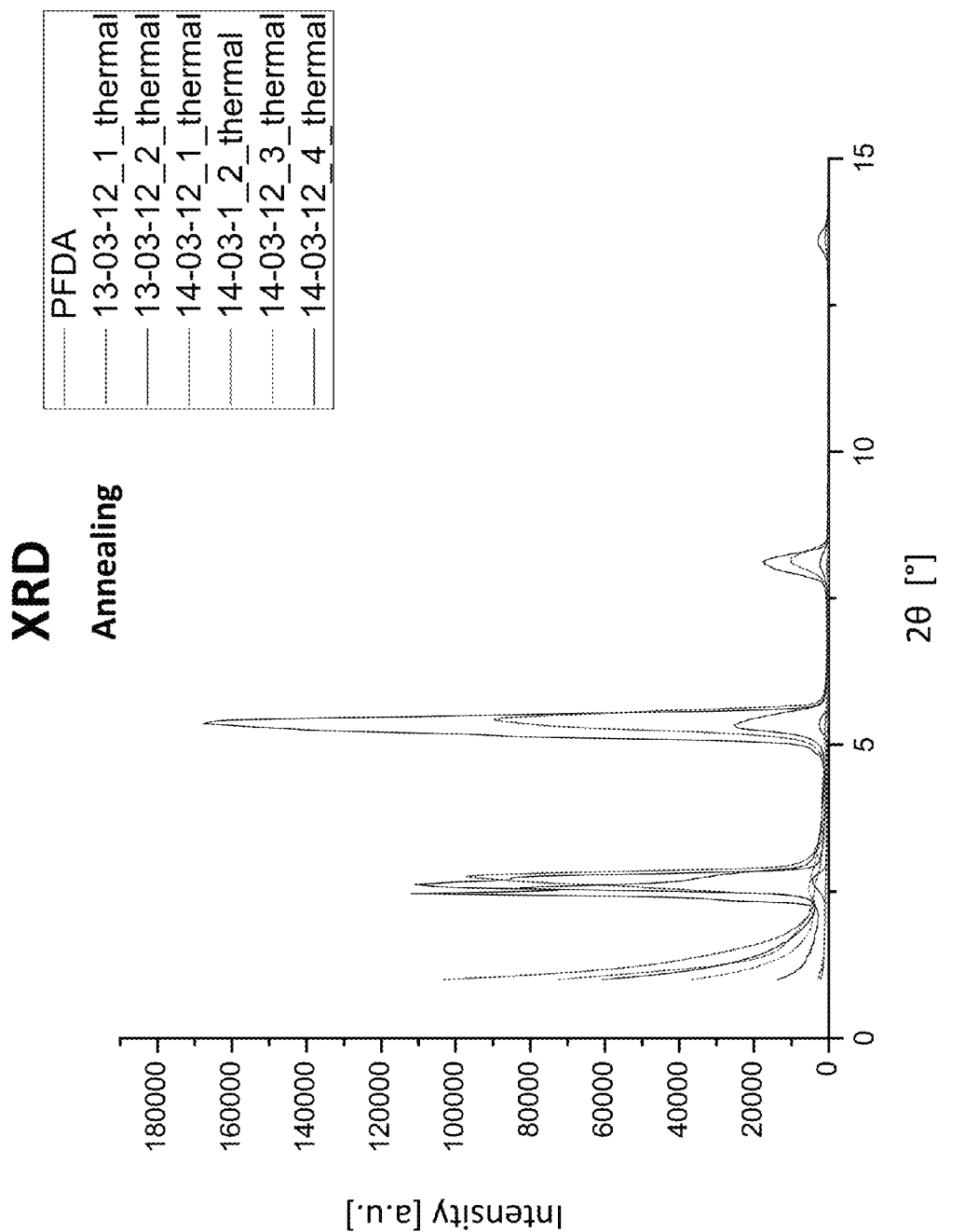
FIG. 16 illustrates XRD analysis of the pPFDA homopolymer, the pDVB homopolymer and diverse P(PFDA-co-DVB) copolymer after the annealing process in accordance with some embodiments presented herein.

In this Example, polymerizations were conducted in a custom-design cylindrical reactor (diameter 24.6 cm and height 3.8 cm). On top of the reactor laid a quartz top that allowed laser interferometry (633-nm He—Ne laser, JDS Uniphase) for in-situ film thickness monitoring. Inside the reactor, 14 parallel ChromAlloy filaments (Goodfellow) were resistively heated at 230° C. and the stage was backcooled at a constant temperature of 30° C. by water using a recirculating chiller/heater (Neslab RTE-7). Reactor pressure was maintained at 200 mTorr using a throttle valve (MKS Instruments). The radical initiator, and the gas carrier were delivered inside the reactor through mass flow controllers (MKS Instruments). The fluorinated PFDA monomer and the DVB cross-linker were heated in a glass jar to a temperature of 80° C. and 60° C. respectively, and their flows were controlled by needle valves. The flow rates of initiator and monomer were kept constant at 3.2 and 0.2 sccm. For the different experiments, the flow rate of crosslinker was varied to 0, 0.2, 0.6 and 1 sccm, and a patch flow of gas carrier was introduced to keep a total flow of 5 sccm. Thickness samples ranged from 10 nm to 3 µm. FIG. 10 shows incorporation of DVB in the copolymer film.

iCVD Deposition Experiment B—Grafted
p(PFDA-co-DVB)

To deposit a silane adhesion layer prior to grafted iCVD polymerization, substrates were first cleaned by sonication in acetone for 5 minutes, followed by rinsing in DI water (18 MOhm), followed by sonication in isopropanol for 5 minutes, and finally a rinse with DI water. The surfaces were treated with oxygen plasma for 10 minutes for further cleaning and for creating surface hydroxyl groups. After plasma treatment, the surfaces were immediately placed in a vacuum desiccator along a small open vial containing 100 µL, of either trichlorovinylsilane (97%, Sigma Aldrich) as a grafting precursor for the polymer films. The chamber was pumped down to 200 mTorr, and the chamber was isolated to allow the silane to vaporize. The chamber was purged twice more, then isolated. The silane was allowed to vaporize and react with the substrate for 2 hours. After deposition, the surfaces were sonicated in toluene to remove excess unreacted silane and rinsed with DI water.

iCVD polymerizations were conducted in a custom-design cylindrical reactor (diameter 24.6 cm and height 3.8 cm), supporting an array of 14 parallel chromoalloy filaments (Goodfellow) suspended 2 cm from the stage. Tert-butyl peroxide (TBPO) (98%, Aldrich), PFDA (97%, Aldrich), and DVB (80%, Aldrich) were used as received. The peroxide initiator, TBPO, was delivered into the reactor through a mass flow controller (MKS Instruments) at a constant flow rate of 3.2 sccm. PFDA and DVB were vaporized in glass jars that were heated to 80 and 60° C., respectively. The flow rates were controlled using needle valves and kept constant at 0.2 and 0.6 sccm. The filaments were resistively heated to 230° C. using a DC power supply (Sorensen), and the temperature was measured by a K-type thermocouple (Omega Engineering). The sample stage was backcooled at 30° C. using a recirculating chiller/heater (Neslab RTE-7). The working pressure was maintained at 200 mTorr using a throttle valve (MKS Instruments). The reactor was covered with a quartz top (2.5 cm) that allowed for in-situ thickness monitoring by interferometry with a 633 nm HeNe laser source (JDS Uniphase). Final thickness of the copolymer deposited on the metal substrate corresponded to 40 nm. Afterwards, a thermal annealing process was performed by introducing the sample in an oven (VWR) at 80° C. for 30 min. The full width at half-maximum (FWHM) was fixed at 2-3 eV to take into account the broadening of the 1 eV electron beam, while using XPS Scienta Database Fls peaks with FWHM of 2 eV.

iCVD Deposition Experiment C—Annealing

Figure 9:
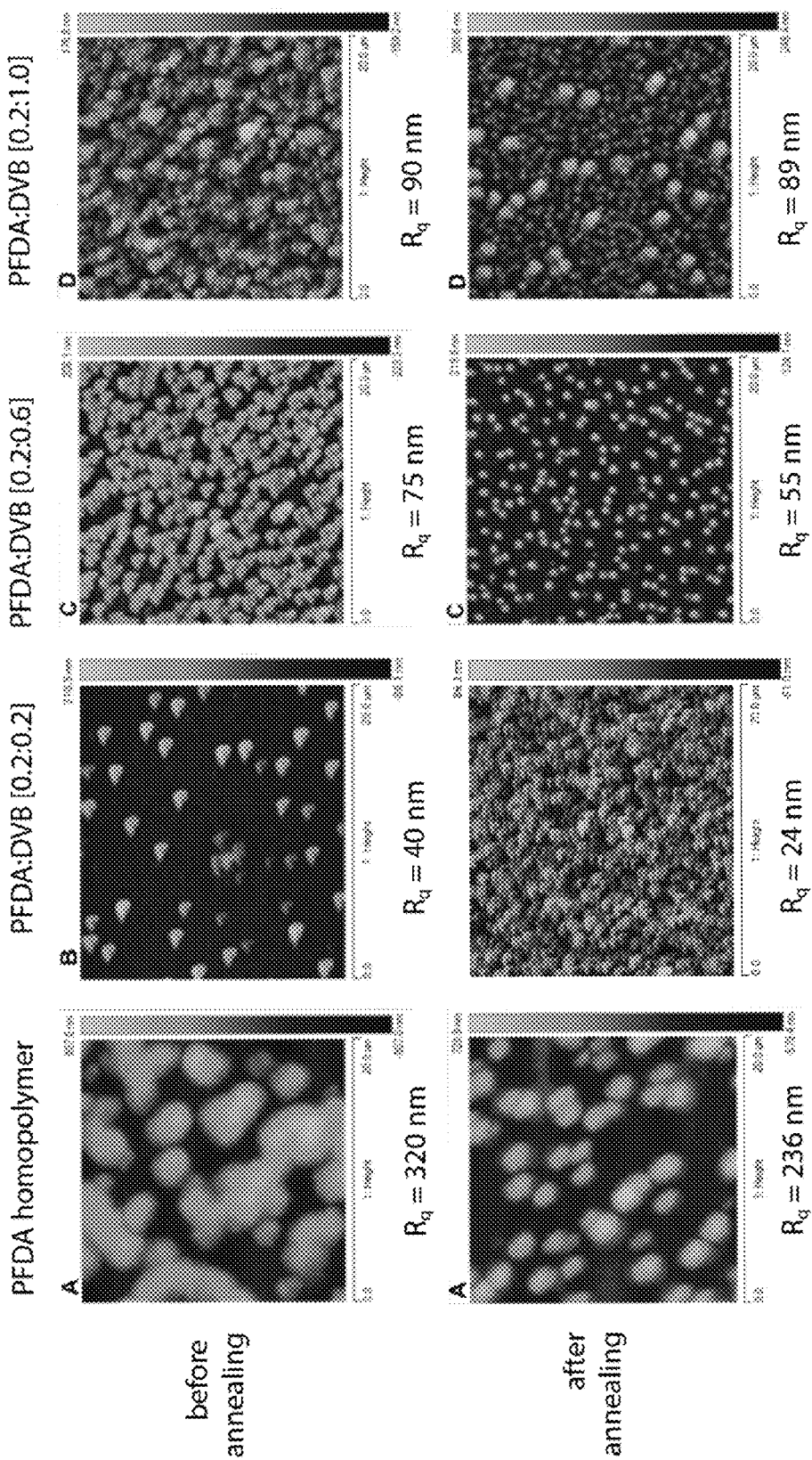
FIG. 9 shows AFM images of the poly(1H,1H,2H,2H-perfluorodecyl Acrylate) (pPFDA)homopolymer and different poly(1H,1H,2H,2H-perfluorodecyl Acrylate-copolymer-divylbenzene) (p(PFDA-co-DVB)) copolymers before and after annealing. The flow rate for each monomer is provided between the brackets.
Figure 17:
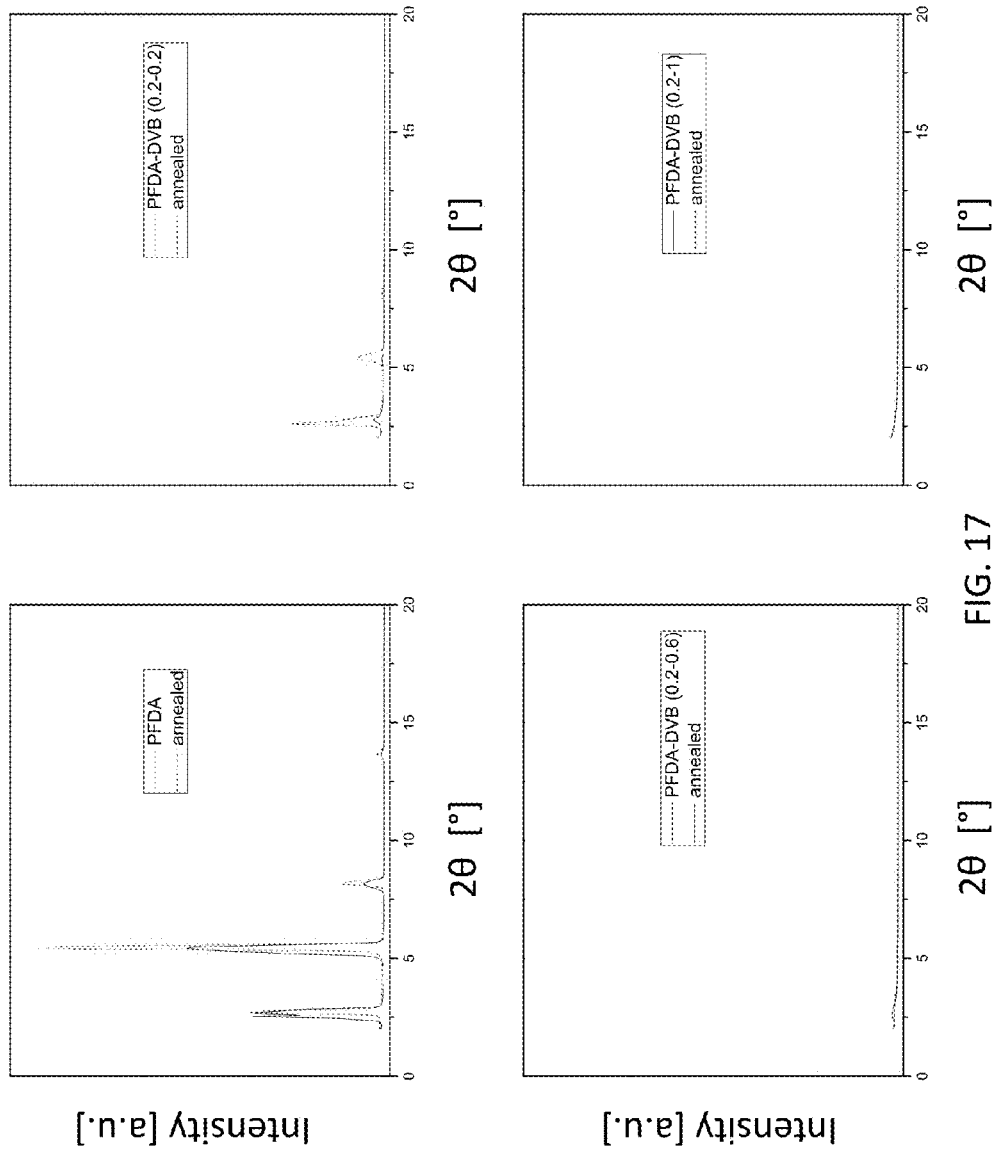
FIG. 17 shows XRD Comparison of pPFDA homopolymer and a series of p(PFDA-co-DVB) copolymer films before and after thermal annealing in accordance with some embodiments presented herein.

This Example characterizes samples that were prepared via iCVD deposition of p(PFDA-co-DVB) on silicon substrates before and after annealing. iCVD films were prepared in the same manner described in iCVD Deposition Example—p(PFDA-co-DVB), and then further characterized by AFM. After iCVD deposition, samples were annealed in a furnace at 80° C. for 30 min and characterized again by AFM. Referring now to FIG. 9, we observe that after annealing, the quadratic mean roughness of all surfaces decreases, indicating an increase in the degree of crystallinity in the case of the PFDA homopolymer and an increase in the degree of crosslinking in the cases of the DVB-crosslinked copolymers. Referring now to FIG. 17 showing a comparison of XRD spectra of PFDA homopolymer and p(PFDA-co-DVB) films before and after thermal annealing, we also observe an increase in the degree of crystallinity of PFDA homopolymer as evidenced by the increased area under the curve corresponding to intensity vs. 2θ, and a decrease in degree of crystallinity of the crosslinked polymers as evidenced by a decrease in the area under the curve corresponding to intensity vs. 2θ.

iCVD Deposition Experiment D—Eco-Friendly
pC6PFA-co-DVB

In this Example, films of varying compositional ranges of 1H,1H,2H,2H-perfluorooctyl acrylate) (pC6PFA;C6) and divinylbenzene (DVB) were deposited via iCVD on silicon wafer substrates. Flowrates of monomer and initiator species and nitrogen patch flow are indicated in Table 5 below.

TABLE 5

Nomenclature and flow rates of precursors

| Sample | Flow rate (sccm) | | | |
|---|---|---|---|---|
| | C6PFA | DVB | TBPO | $N_2$ |
| C0 | 0.2 | 0 | 1.2 | 1.6 |
| C1 | 0.2 | 0.2 | 1.2 | 1.4 |
| C2 | 0.2 | 0.4 | 1.2 | 1.2 |
| C3 | 0.2 | 0.6 | 1.2 | 1 |
| C4 | 0.2 | 1 | 1.2 | 0.6 |

Figure 21:
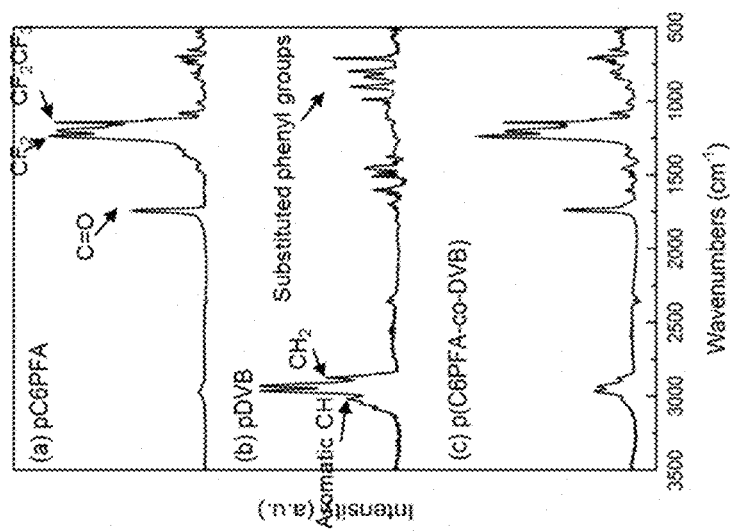
FIG. 21 is a plot showing FT-IR spectra of eco-friendly pC6PFA homopolymer (a), the pDVB homopolymer (b), and the p(C6PFA-co-DVB) copolymer.

The Fourier transform infrared spectroscopy (FT-IR) spectra of the films are shown in FIG. 21. pC6PFA homopolymer gives a sharp band due to carbonyl group at 1743 $cm^{-1}$. The two bands at 1237 and 1204 $cm^{-1}$ are caused by the asymmetric and symmetric stretching of the $-CF_2$- moiety, respectively. The sharp band at 1146 $cm^{-1}$ is caused by the $-CF_2-CF_3$ end group. The pDVB homopolymer FT-IR spectrum shows the $-CH_2-$ stretching bands at 2871 $cm^{-1}$, confirming the formation of backbone. The aromatic $-CH-$ contribute to bands between 3000 and 3100 $cm^{-1}$. The bands between 700 and 1000 $cm^{-1}$ are characteristics of substituted phenyl groups. The band at 903 $cm^{-1}$ results from unreacted vinyl groups. The copolymer presents all the characteristic bands associated with its components. The FT-IR results show the incorporation of the two monomers into the copolymer film and the retention of the chemical functionality from both reactants after the polymerization.

The effects of DVB crosslinking on CAH were studied by WCA measurements (FIG. 22). pC6PFA homopolymer film presents high static WCA and advancing WCA, but low receding WCA. This behavior of pC6PFA surface has been well explained: in its dry state, the fluoroalkyl side chains orient to the outermost surface layer due to phase segregation between hydrogenated and fluorinated moieties. Surface reorganization occurs in presence of water, leading to surface exposure of hydrophilic moieties. The reconstruction easily happens because pC6PFA is unable to form crystalline structure. In contrast, p(C6PFA-co-DVB) films show improved dynamic water repellency. The receding WCA of all copolymer films are significantly enhanced. The movement of water front can be affected by surface roughness, heterogeneity, reorientation, and mobility. The AFM observation of films shows that the differences in roughness are not significant enough to influence the WCA hysteresis. Therefore the results suggest that the crosslinking of DVB units hinders the reorientation of surface fluorine groups. It is hypothesized here that the DVB units have two effects, on main chain and side chain respectively, contributing to the restrain of fluorine groups (FIG. X): first, the rigid crosslinker can reduce the flexibility of main chain, reducing the $T_g$; second, the planar crosslinker can sterically mitigate side chain reconstruction by reducing free volume.

Film Deposition Experiment—Effect of Spacer Groups

Figure 24:
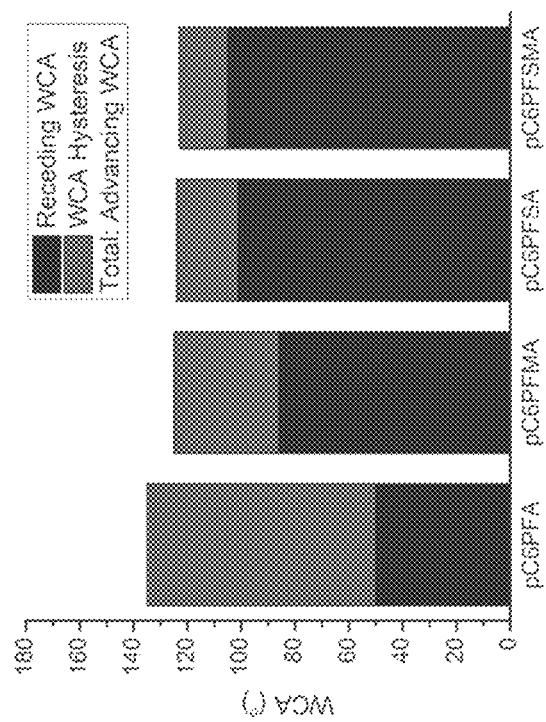
FIG. 24 is a plot of the advancing and receding contact angles, along with the contact angle hysteresis, of eco-friendly small-chain perfluorinated films, in accordance with some embodiments presented herein.

Do demonstrate the ability of the spacer group to affect the rigidity and thus CAH of deposited films, thin films of 1H,1H,2H,2H-perfluorooctyl acrylate (C6PFA)Poly(2-(Perfluorohexyl)ethyl methacrylate) (pC6PFMA) [N-methyl-perfluorohexane-1-sulfonamide]ethyl acrylate (C6PFSA) and [N-methyl-perfluorohexane-1-sulfonamide]ethyl (meth) acrylate (C6PFSMA) were spin-coated onto silicon substrates. Advancing and receding contact angles and CAH are shown in FIG. 24, indicating that the additional dipole-dipole interactions afforded by the spacer group of pC6PFSMA act to significantly reduce the CAH as compared to pC6PFA as shown in FIG. 23.

Film Characterization Experiment A —XPS Spectra

Figure 5:
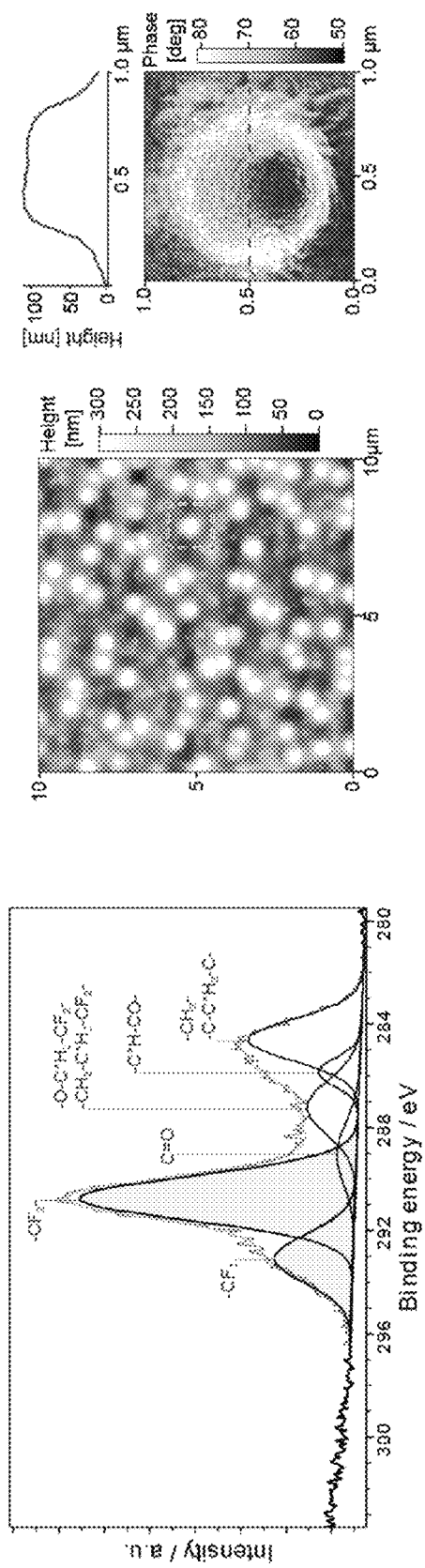
FIG. 5 (left) illustrates high resolution angle-resolved XPS spectra taken at 0° takeoff angle. Peaks corresponding to —$CF_2$— and —$CF_3$ environments are highlighted.

FIG. 5 (left) shows the high-resolution C1s X-ray photoelectron spectra (XPS) of the iCVD p(PFDA-co-DVB) copolymer surface. The pendant groups from the PFDA consist of $-CF_2-$ and $-CF_3-$ and these two bonding environments can be readily resolved at 290.8 and 293.1 eV, respectively. In aggregate, these fluorinated carbon groups account for 61.8±0.4% of the area of the spectrum. The assignments at lower binding energies represent carbon items directly bonded only to oxygen, hydrogen, or other carbon atoms. However, the precise assignments of the peaks at lower binding energy is ambiguous due to the multitude of environments arising from the main acrylate portion of the PFDA and from the DVB.

The $-CF_2-$ and $-CF_3-$ bonding environments were previously observed in C1s XPS spectrum of the iCVD PFDA homopolymer, representing a combined area of 61.4±0.3% and in agreement with the structural formula for PFDA which gives a theoretical value of 61.5%. The similarity with homopolymer results suggests the degree of DVB crosslinker incorporation in the copolymer in the near-surface region probed by XPS is quite low. Thus, the surface properties of the copolymer in the dry state, such as the advancing contact angle, will be dominated by the PFDA units. When examined by Fourier transform infrared spectra (FTIR), which penetrates the entire film thickness, $sp^2$ C—H stretching modes between 2810 and 2890 $cm^{-1}$ were observed, confirming the incorporation of the DVB in the bulk of the film. These underlying crosslinking units are anticipated to reduce the ability of the surface layer to reconstruct between the dry and wet states, potentially reducing this contribution to contact angle hysteresis. By following a deposition of PFDA:DVB 0.2:0.6 sccm with a thermal annealing step, the advancing and receding water contact angles on the resultant thin film are 132°±1° and 127°±1°, respectively, with a CAH of 5°. Average film thicknesses were measured by ellipsometry, AFM, and contact profilometry to be 41.5±2.4 nm. AFM scans (FIGS. 1d and 1e) illustrate that the surface is covered by structures with a height of ca. 100 nm and an average spacing of 1.3±0.7 μm, resulting in an RMS roughness of 75 nm. These rough features are semicrystalline aggregates formed at nucleation sites during the condensation polymerization reaction of the monomers.

Previous literature has shown that $-(CF_2)-CF_3$ chains with n≥leads to aggregates in a smectic B structure that arrange into a rotationally symmetric fiber texture. On the other hand, the fluorosilane surface, which is composed of larger, less sterically-hindered functional groups with a thickness of 2.5 nm and an RMS roughness of 1.5±0.3 nm, exhibited a CAH of 25°±3°. Since the roughness of the silanized surface is lower than that of the copolymer surface, morphology alone cannot explain the lower hysteresis of the copolymer surface. Instead, this may be attributed to the steric hindrance induced by the crosslinking that prevents the $-CF_3$ groups from shifting away from their low-energy unwetted state.

Film Characterization Experiment B—Film Thickness Measurements

Film thicknesses were measured with variable-angle ellipsometric spectroscopy (VASE, M-2000, J. A. Woollam)

and by measuring scratch step height with atomic force microscopy (AFM, MP3D-SA, Asylum) and contact profilometry (Model 150, Dektak). All VASE thickness measurements were performed at a 70° incidence angle using 190 different wavelengths from 315 to 718 nm. A nonlinear least-squares minimization was used to fit ellipsometric data of dry films to the Cauchy-Urbach model. The thickness was obtained upon convergence of the algorithm. FTIR measurements were performed on a Nicolet Nexus 870 ESP spectrometer in normal transmission mode equipped with a MCT (mercury cadmium tellurium detector and KBr beamsplitter. Spectra were acquired over the range of 400 to 4000 $cm^{-1}$ with a 4 $cm^{-1}$ resolution for 256 scans. All AFM thickness measurements were performed in tapping mode over an area of 20 µm×20 µm using a cantilever with a tip radius of 9±2 nm (AC200TS, Asylum). The film thickness was calculated as the difference between the average heights of the rough film surface and the trough of the scratch; the rough built-up edge of the scratch was masked from analysis. The profilometry measurements were performed with a stylus having a radius of 12.5 µm. The film thickness was similarly calculated as the difference in the average height of the rough film and the smooth scratch trough. AFM and profilometry measurements were repeated on at least four locations. Film thickness is reported as the mean and standard deviation of all measurements.

Film Characterization Experiment C—Surface Roughness Measurements

Surface roughness was measured using atomic force microscopy (AFM, MP3D-SA, Asylum) in tapping mode. The advancing and receding contact angles were measured using a goniometer (Model 590 Advanced, ramé-hart). The hysteresis was also measured during condensation on the grafted polymer sample as the difference between the receding and advancing ends of a drop immediately before departure. Contact angles during condensation on the silanized sample could not be measured due to the film covering the surface.

Dropwise Condensation Experiment A—Nucleation and Shedding Comparison

In addition to CAH, the dropwise condensation heat transfer depends on a number of complex factors including nucleation site density and population distribution. To investigate the behavior of these surfaces during condensation, saturated pure water vapor at 800 Pa was condensed while cooling the surface with a Peltier device to a supersaturation of 1.16±0.05 and imaging with an environmental scanning electron microscope (ESEM). 2 mm×2 mm sample substrates were secured to an aluminum stub with double-sided carbon adhesive and instrumented with a K-type thermocouple embedded into the tape. The aluminum stub was clamped into a Peltier cooling stage (Coolstage Mk 2, Deben) which was attached to the stage of an environmental scanning electron microscope (EVO 55, Zeiss). The chamber was purged with water vapor three times up to 3 kPa and down to 10 Pa to remove non-condensable gases. After purging, the pressure was held at 800 Pa, and the temperature was slowly decreased at a rate of 0.5 K $min^{-1}$ until formation of observable water droplets (>1 µm diameter). Accelerating voltage was 20 kV and beam current was 100 nA. Images were recorded at ca. 1 Hz, and the stage was moved to different areas to avoid charging effects on nucleation. Nucleation densities were measured as the mean and standard deviation of at least five different locations on each surface. During the pre-coalescence growth regime, it was observed that the nucleation density on a p(PFDA-co-DVB) surface (173±19 $mm^{-2}$, as shown in FIG. 2a) was significantly higher than that on a fluorosilane surface (110±10 $mm^{-2}$, as shown in FIG. 2b)—owing at least in part to the rougher surface providing a larger number of concavities that act as nucleation sites. During condensation of an air stream saturated with water vapor under ambient conditions (21° C., 40% relative humidity), the departing diameter was 2.0±0.3 mm (as illustrated in FIG. 2c). This is considerably smaller than the departing drop sizes on other common hydrophobic modifiers such as gold (3.3 mm) and oleic acid (4.3 mm). When compared to a silanized silicon surface with a departing diameter of 2.9±0.2 mm (as shown in FIG. 2d), a shift was also observed in the distribution of droplet diameters to smaller sizes (as shown in FIG. 2e). The increased nucleation density, lower departure diameter, and droplet size distribution of the copolymer surface on a smooth silicon substrate indicate an improved condensation heat transfer coefficient according to widely-accepted models.

Dropwise Condensation Experiment B—Aluminum Substrate Experiment

Commercial condensers are typically constructed using alloys of metals such as titanium, stainless steel, copper, and aluminum. To test a prototype that was most similar to an industrial condenser, a 40 nm film of p(PFDA-co-DVB) was grafted onto 50 mm diameter aluminum substrates via iCVD. The additional roughness imparted by the metal surface (RMS=118±33 nm) was apparent in the AFM height scans (shown in FIGS. 3a and 3b). As expected on a rougher surface in a Wenzel state, the CAH measured during condensation at 6.9 kPa was similar (37°±5°) and accordingly, the size of a departing drop (4.2±0.1 mm) was larger than that on a silicon substrate (as shown in FIG. 3c).

Dropwise Condensation Experiment C—Effect of Grafting

In this Example, coated substrates were tested for condensation performance in the apparatus described below and shown in FIG. 6. The flow loop of the test apparatus is shown in FIG. 7. Saturated steam is produced by an electric boiler using deionized feedwater with a resistivity of 5 MOhm that is further passed through a membrane vacuum degassifier to reduce dissolved oxygen to below 1 ppm. The steam is produced at 380 kPa and passes through a pressure regulator and a separator to the condensing chamber, which is evacuated before each test by a rotary vane vacuum pump. The sample is cooled by a heat exchanger operating at 60 psig with 1 MOhm deionized chilled water at 4° C.

Figure 6:
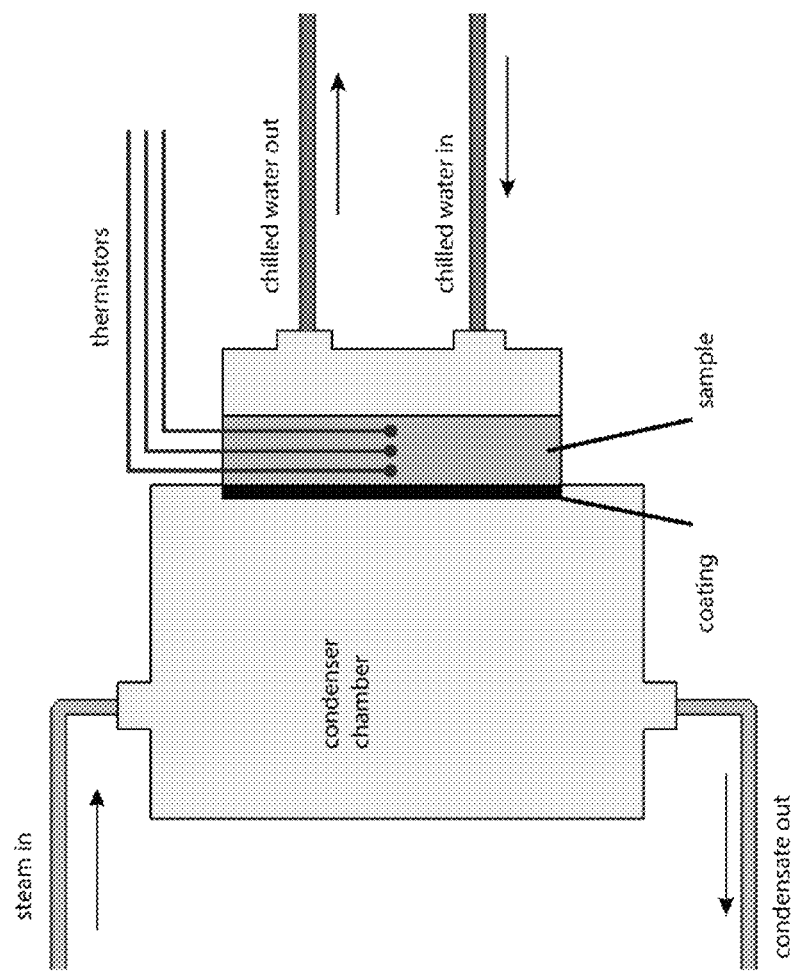
FIG. 6 illustrates the experimental chamber that was used in Dropwise Condensation Expeiments.
Figure 7:
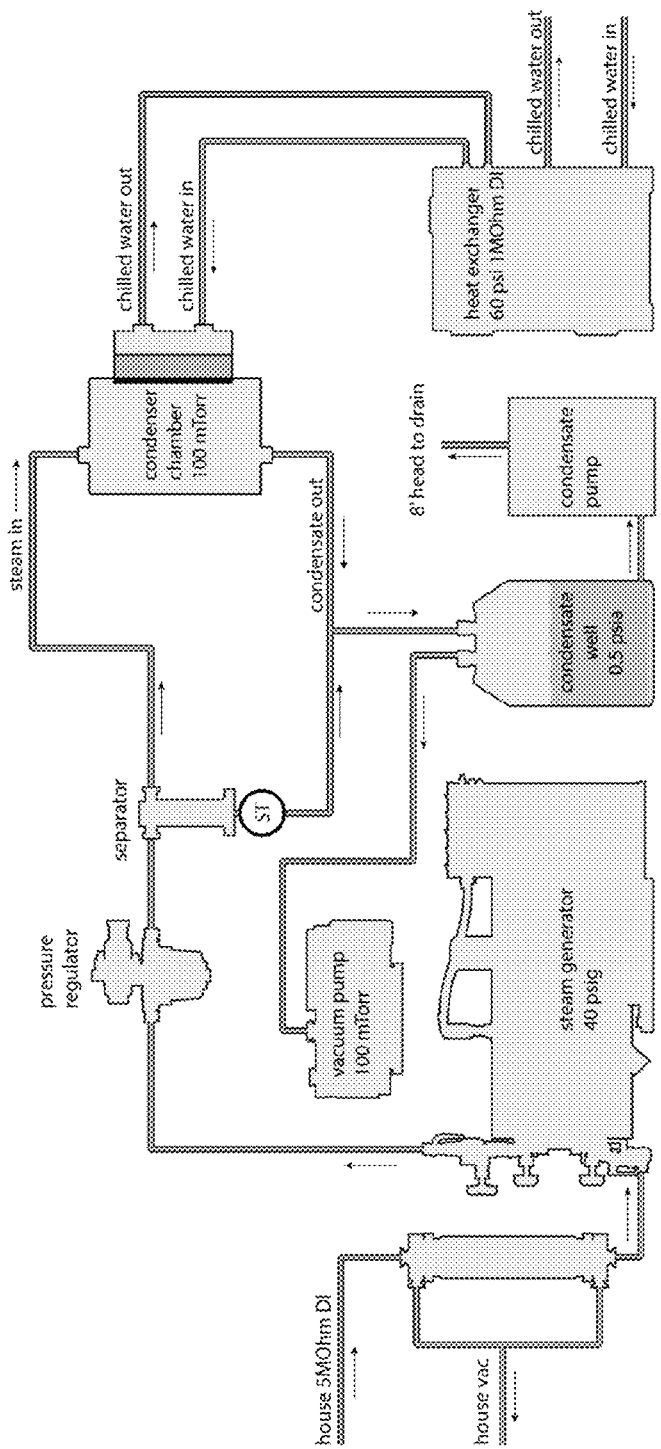
FIG. 7 illustrates the flow loop of the experimental setup shown in FIG. 6.

Condensing specimens coated with p(PFDA-co-DVB) were secured in a chamber with the coated side exposed to saturated steam and the other side cooled by running water, in FIG. 6. The chamber was initially evacuated to remove non-condensable vapors, and steam was introduced at a variable rate to maintain pressures ranging from 10 kPa to 100 kPa. Saturated steam was produced by an electric boiler using deionized feedwater with a resistivity of 5 MOhm that was fed through a degassifier to reduce dissolved oxygen to below 1 ppm. The rear side of the sample was cooled by a forced chilled water at 4° C. Temperature gradients within the specimens were measured by thermistors embedded at precise locations within the specimen. The heat transfer coefficient could be determined from the temperature gradient and the surface temperature. After several hours of operation, the coated specimens exhibited an improved heat transfer coefficient.

Figure 8:
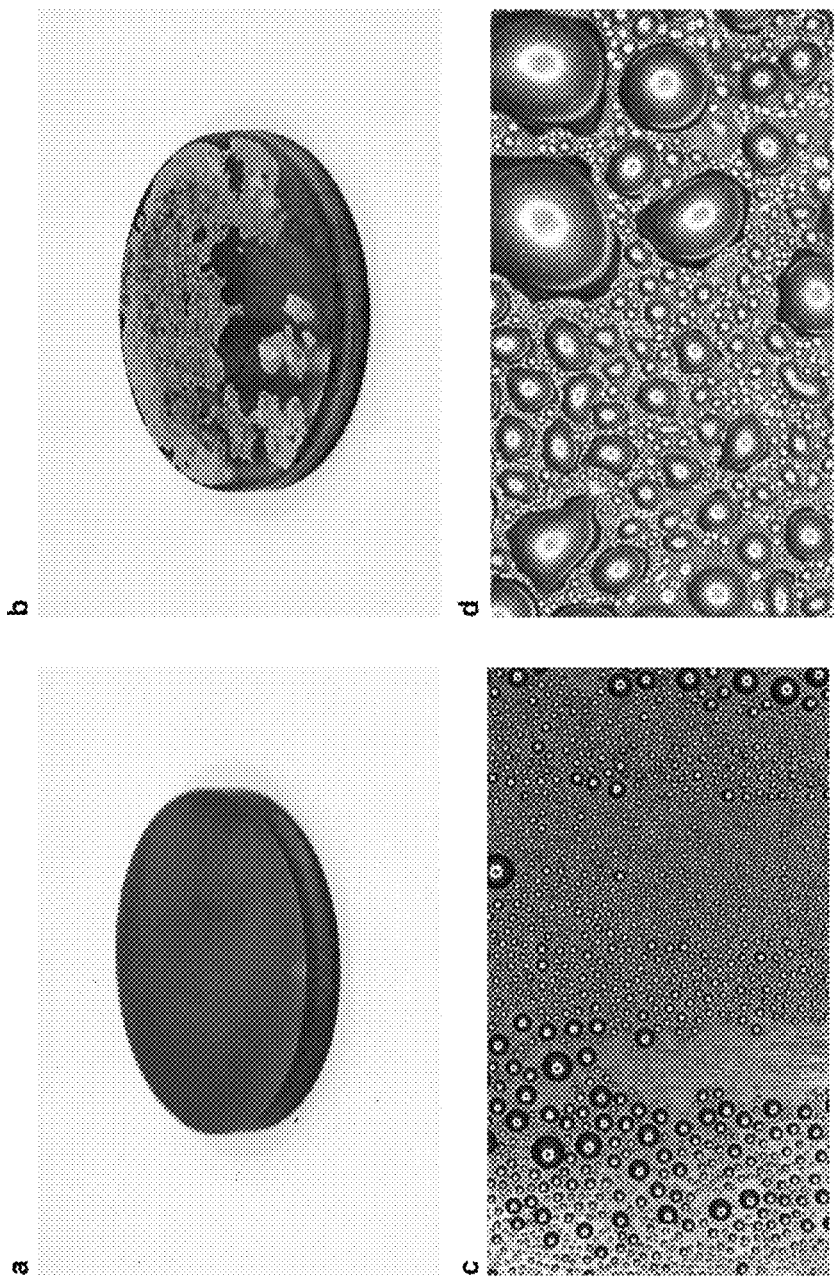
FIG. 8a illustrates grafted PFDA samples after 1 hour of condensation in saturated steam at 90° C. and 70 kPa.
FIG. 8b illustrates ungrafted PFDA sample after 1 hour of condensation in saturated steam at 90° C. and 70 kPa. Condensate drops on grafted (FIG. 8c) and ungrafted (FIG. 8d) PFDA surfaces after 10 minutes of condensing saturated steam. The distorted drop shape on the ungrafted sample indicates severe contact line pinning Departing drop sizes on ungrafted sample were 3.1 mm, compared to 2.3 mm for the grafted surface. Heat transfer coefficient was measured at 31±2 kW/m$^2$K at the beginning of the experiment, and 23±2 kW/m$^2$K after deterioration of ungrafted surface.

FIGS. 8a-8b show (a) Grafted PFDA and (b) ungrafted PFDA samples after 1 hour of condensation in saturated steam at 90° C. and 70 kPa. FIGS. 8c-8d also show condensate drops on (c) grafted and (d) ungrafted PFDA surfaces after 10 minutes of condensing saturated steam. The distorted drop shape on the ungrafted sample indicates severe contact line pinning following delamination of the polymer film. Departing drop sizes on ungrafted sample were 3.1 mm, compared to 2.3 mm for the grafted surface. Heat transfer coefficient was measured at 31±2 kW/m²K at beginning of test, 23±2 kW/m²K after deterioration of ungrafted surface. This example illustrates how covalent grafting can significantly improve the adhesion of the polymer films on metal substrates and increase their durability in the presence of condensing steam.

Dropwise Condensation Experiment D—Film Thickness & Heat Transfer Coefficient

Figure 1B:
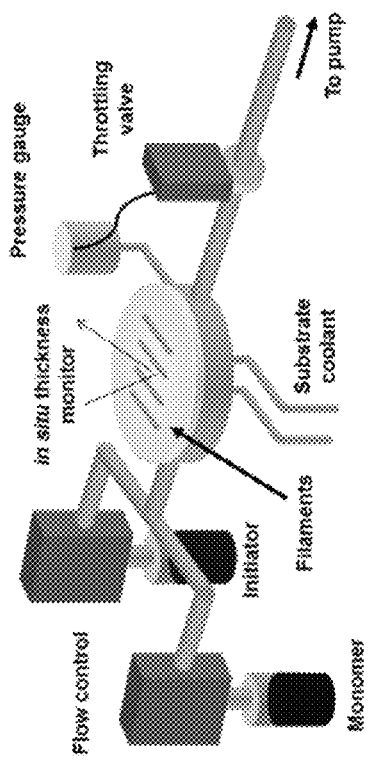

Referring now to FIG. 1a, monomer and initiator species are flowed into a reactor at controlled rates, where the monomer and initiator species encounter heated filaments and a cooled substrate, as shown in FIG. 1b. The locally heated zone around the filaments thermally cleaves the initiator species (tert-butyl peroxide, TBPO). The produced radical fragments initiate vinyl polymerization of the monomers absorbed on the surface, which is held at a lower temperature. The functional groups, such as the perfluorinated side chain of PFDA, are fully preserved after polymerization.

The film thickness is measured in-situ during deposition, so that the process can be stopped when the thickness reaches the desired value. In some embodiments, the iCVD copolymer layers are ultra-thin (~40 nm), leading to an estimated contribution to total thermal resistance of less than 0.001%. To verify that the film thickness did not have an effect on the condensation heat transfer coefficient, two different thicknesses of films were measured, with the results being provided in Table 6 below. As seen in Table 6 below, the condensation heat transfer coefficients of the two film thicknesses are nearly identical.

TABLE 6

Effect of Film Thickness on Heat Transfer Coefficient

| Thickness (nm) | h (k W m$^{-2}$ K$^{-1}$) |
|---|---|
| 41.5 ± 2.4 | 38.1 ± 4.0 |
| 59.2 ± 6.6 | 39.5 ± 4.2 |

Dropwise Condensation Experiment E—Prolonged Exposure Experiment

Accelerated endurance tests were conducted by condensing pure saturated steam at 100° C., Coatings of p(PFDA-co-DVB) were compared to fluorosilane coatings, both on aluminum substrates (shown in FIGS. 3c and 3d). FIG. 3e shows a comparison of these two surfaces, along with an uncoated aluminum surface that undergoes filmwise condensation for reference, under prolonged condensation at 103.4 kPa. Although the silanized surface initially displayed a larger heat transfer coefficient of 61±2 kW m$^{-2}$ K$^{-1}$ due to the lower hysteresis (31°±3°) and departing droplet size (3.6±0.4 mm), it quickly degraded in a matter of minutes and exhibited dropwise condensation with a heat transfer coefficient of 4.6±0.4 kW m$^{-2}$ K$^{-1}$. The grafted polymer coating exhibited dropwise condensation with a departing droplet size of 4.2±0.1 mm and a heat transfer coefficient greater than 35 kW m$^{-2}$ K$^{-1}$, which was more than 7 times greater than the steady-state filmwise heat transfer coefficient of the degraded silanized surface, with no noticeable degradation after 48 hours of condensation.

Grafted polymers deposited via iCVD lead to robust dropwise condensing surfaces that can sustain prolonged exposure (e.g., >48 hours) to steam at 100° C., significantly outperforming a fluorosilane treatment tested under identical conditions. A simple first-order exponential to fit to the degradation of the heat transfer coefficients results in degradation time constants of ca. 2 minutes and O≈10$^4$ hours for fluorosilane and grafted copolymer surfaces, respectively. Thermal degradation of films deposited using the iCVD process has previously been tested and described by a logistic model. Since degradation under a steam environment is an entirely different process, and fitting to the logistic model would require knowledge of the time required to degraded to 50%, there is a further need for longer-duration endurance tests. The unique composition of the copolymer achievable iCVD is essential for achieving low contact angle hysteresis, which results from the combination of low roughness and limited reorientation of the surface fluorinated groups between the wet and dry states. iCVD surfaces exhibit heat transfer coefficients that are more than 7 times greater than filmwise condensation when deposited on practical engineering heat transfer substrates, such as aluminum and copper. A successful industrial prototype has been demonstrated and successfully tested, indicating scalability to industrial processes.

Dropwise Condensation Experiment F—Tubing Coil Experiment

Figure 4A:
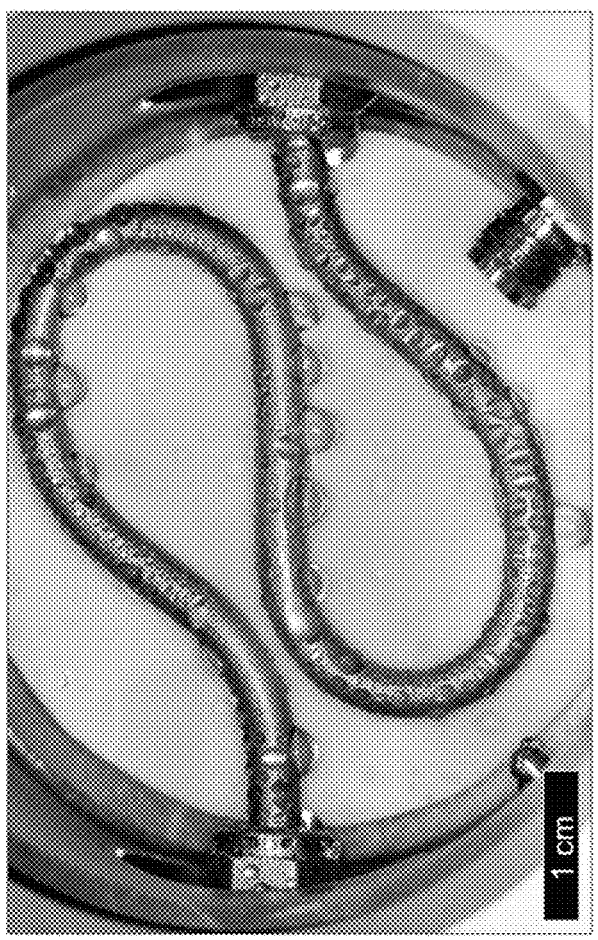
FIG. 4a illustrates dropwise condensation of saturated steam at 6.9 kPa on a copper tube coated with p(PFDA-co-DVB).
Figure 4B:
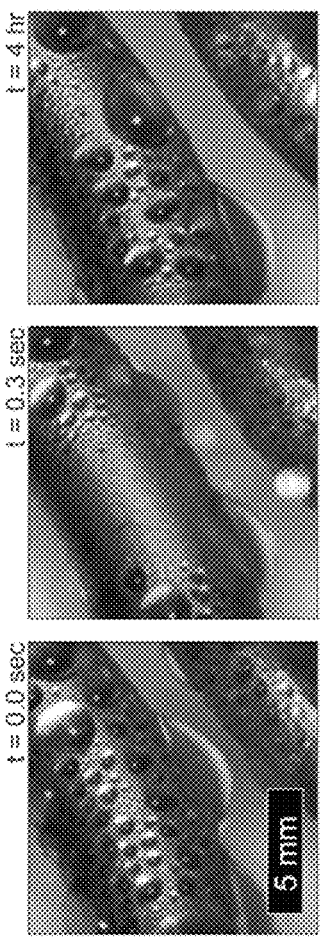
FIG. 4b illustrates snapshots immediately before and after a droplet shedding event (left and center photographs, respectively) and 4 hours after shedding event (right photograph).

As a further demonstration of the versatility of iCVD-deposited copolymers to coat complex shapes such as heat exchanger tubing, a 40 nm thin film of p(PFDA-co-DVB) was grafted conformally onto the outer surface of a copper tubing coil. It would have been exceedingly difficult to achieve such an ultra-thin, uniform layer by common surface modification techniques such as spray coating, spin casting and/or doctor blade application, and/or with vacuum techniques such as sputtering and/or evaporation. As shown in FIGS. 4a-4b, the tubing coil exhibited prolonged dropwise condensation after a single-step deposition.

Dropwise Condensation Experiment G—Hydrocarbon Condensation Experiment

To demonstrate the ability of a grafted iCVD surface to promote dropwise condensation of low-surface tension fluids, a silicon substrate coated with a thin film of p(PFDA-co-DVB) was fixed in a custom-built vacuum chamber shown in FIG. 6 such that the surface was held vertically. Hydrocarbon vapors were supplied by a container filled with 30 ml, of either pentane or hexane, and immersed in a water bath (Julabo FP-25) heated to 40° C. The vacuum chamber was purged three times below 0.1 kPa and above 50 kPa with pentane vapor to remove non-condensables. After purging, the rear side of the surface was cooled with forced chilled water to a temperature of around 10° C. The hydrocarbon vapor pressure was increased by opening a needle valve until the corresponding saturation temperature was greater than 10° C., thus initiating condensation of hydrocarbon vapor onto the chilled copolymer surface. FIGS. 20a and 20b show snapshots of dropwise condensation of hexane on a copolymer film. Hexane CAH and departing diameter are also shown in FIG. 20b. Heat transfer coefficients during condensation of pentane vapor were measured by thermistors embedded behind the surface. The condensation heat transfer coefficient of pentane was 22.5 kW/m$^2$K, condensing at a pressure of 52.0 kPa saturation temperature 17.7° C., surface temperature 17.4° C., and a heat flux of 7.3 kW/m$^2$.

EQUIVALENTS

While the invention has been particularly shown and described with reference to specific preferred embodiments, it should be understood by those skilled in the art that various changes in form and detail may be made therein without departing from the spirit and scope of the invention as defined by the appended claims.

What is claimed is:

1. A condenser comprising a substrate and a polymeric film covalently grafted thereupon, wherein the polymeric film comprises a grafting layer having a thickness no greater than 5 nm and a bulk film layer, and wherein the polymeric film is cross-linked with divinyl benzene, has a thickness no greater than 1500 nm, and has a surface with low contact angle hysteresis of no greater than 50° for water.

2. The condenser of claim 1, wherein the substrate comprises a metal.

3. The condenser of claim 1, wherein the polymeric film comprises a fluoropolymer.

4. The condenser of claim 1, wherein the polymeric film comprises a fluoropolymer having at least one CF$_3$ group.

5. The condenser of claim 1, wherein the polymeric film comprises a fluoropolymer that is a C6 analog of poly (perfluorodecylacrylate) (PFDA).

6. The condenser of claim 1, wherein the polymeric film comprises a copolymer of two or more monomer species.

7. The condenser of claim 1, wherein the polymeric film comprises a cross-linked polymer and/or a cross-linked copolymer.

8. The condenser of claim 1, wherein the polymeric film has a non-uniform concentration of divinyl benzene along the thickness of the film.

9. The condenser of claim 1, wherein the polymeric film is covalently grafted to the substrate by attachment of a vinyl precursor to the substrate, thereby forming a surface comprising a plurality of pendant vinyl moieties.

10. The condenser of claim 9, wherein the vinyl precursor comprises at least one vinyl precursor selected from the group consisting of trichlorovinylsilane, bis(triethoxysilylethyl)vinylmethyl-silane, bis(triethoxysilyl)ethylene, bis(trimethoxysilylmethyl)ethylene, 1,3-[bis(3-triethoxysilylpropyl)poly-ethylenoxy]-2-methylenepropane, bis[(3-trimethoxysilyl)propyl]-ethylenediamine, bis[3-(triethoxysilyl)propyl]-disulfide, 3-mercaptopropyltrimethoxysilane, and vinyl phosphonic acid.

11. The condenser of claim 1, wherein the polymeric film is no greater than 1000 nm in thickness.

12. The condenser of claim 1, wherein a surface of the substrate is textured; and the polymeric film conforms to the textured surface of the substrate.

13. The condenser of claim 1, wherein the polymeric film has a crystalline or semicrystalline surface.

14. The condenser of claim 1, wherein the polymeric film has a surface with low contact angle hysteresis of no greater than 25° for water; the polymeric film has a surface with low contact angle hysteresis no greater than 20° for hydrocarbons, refrigerants, cryogenic liquids, and other low-surface tension liquids; and where contact angle hysteresis is the difference between advancing contact angle and receding contact angle.

15. The condenser of claim 1, wherein the polymeric film has a surface with high advancing contact angle of no less than 70° for water, and the polymeric film has a surface with high advancing contact angle of no less than 30° for hydrocarbons, refrigerants, cryogenic liquids, and other low-surface tension liquids; or the polymeric film has a surface with high receding contact angle of no less than 60° for water, and the polymeric film has a surface with high receding contact angle of no less than 20° for hydrocarbons, refrigerants, cryogenic liquids, and other low-surface tension liquids.

16. The condenser of claim 1, wherein the polymeric film has an exposed surface with critical surface energy no greater than 18 mN/m.

17. The condenser of claim 16, wherein the polymeric film has an exposed surface with critical surface energy no greater than 6 mN/m.

18. The condenser of claim 1, wherein the polymeric film has RMS roughness no greater than 100 nm.

19. A condenser for promoting dropwise condensation of a condensing liquid, the condenser comprising:
a substrate; and
a polymeric film covalently grafted on the substrate,
wherein the polymeric film comprises a grafting layer having a thickness no greater than 5 nm and a bulk film layer,
the polymeric film comprises a cross-linked polymer cross-linked with divinyl benzene, and
the polymeric film has a surface with low contact angle hysteresis of no greater than 50° for water.

20. The condenser of claim 19, wherein the polymer is a C6-type fluoropolymer.

21. The condenser of claim 20, wherein the C6-type fluoropolymer is selected from the group consisting of 3,3,4,4,5,5,6,6,7,7,8,8,8-tridecafluorooctyl methacrylate, 1H, 1H, 2H, 2H-perfluorooctyl acrylate, 2-(perfluorohexyl) ethyl methacrylate, [N-methyl-perfluorohexane-1-sulfonamide]ethyl acrylate, [N-methyl-perfluorohexane-1-sulfonamide]ethyl (meth) acrylate, 2-(Perfluoro-3-methylbutyl) ethyl methacrylate, 2-[[[[2-(perfluorohexyl) ethyl]sulfonyl] methyl]-amino]ethyl]acrylate, and copolymers thereof.

22. The condenser of claim 19, wherein the polymeric film has an exposed surface with critical surface energy no greater than 18 mN/m.

23. The condenser of claim 22, wherein the polymeric film has an exposed surface with critical surface energy no greater than 6 mN/m.

* * * * *